United States Patent
Tanaka et al.

(10) Patent No.: US 11,736,201 B2
(45) Date of Patent: Aug. 22, 2023

(54) OPTICAL TRANSMITTER FOR TRANSMITTING MULTILEVEL OPTICAL SIGNALS

(71) Applicant: FUJITSU LIMITED, Kawasaki (JP)

(72) Inventors: Shinsuke Tanaka, Hiratsuka (JP); Tomoyuki Akiyama, Yokohama (JP); Yohei Sobu, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/718,365

(22) Filed: Apr. 12, 2022

(65) Prior Publication Data

US 2023/0019673 A1    Jan. 19, 2023

(30) Foreign Application Priority Data

Jul. 14, 2021    (JP) ................................. 2021-116070

(51) Int. Cl.
*H04B 10/548* (2013.01)
*H04J 14/08* (2006.01)

(52) U.S. Cl.
CPC ............ *H04B 10/548* (2013.01); *H04J 14/08* (2013.01)

(58) Field of Classification Search
None
See application file for complete search history.

(56) References Cited

U.S. PATENT DOCUMENTS

| | | | |
|---|---|---|---|
| 6,160,647 A * | 12/2000 | Gilliland | H05K 1/141 398/1 |
| 6,271,950 B1 * | 8/2001 | Hansen | H04B 10/572 398/154 |
| 7,646,979 B1 * | 1/2010 | Ciancaglini | H04J 14/0246 398/70 |
| 7,787,713 B2 | 8/2010 | Roberts et al. | |
| 2006/0159384 A1 | 7/2006 | Sugiyama | |
| 2007/0212076 A1 * | 9/2007 | Roberts | H04B 10/5053 398/183 |
| 2012/0251032 A1 * | 10/2012 | Kato | G02F 1/0327 385/3 |

FOREIGN PATENT DOCUMENTS

| | | |
|---|---|---|
| JP | 2006-195256 A | 7/2006 |
| JP | 2008-219760 A | 9/2008 |
| JP | 2009-027517 A | 2/2009 |

* cited by examiner

*Primary Examiner* — David W Lambert
(74) *Attorney, Agent, or Firm* — Fujitsu Patent Center

(57) ABSTRACT

An optical transmitter transmits a modulated optical signal in which each symbol carries M bits. M is an integer larger than one. The optical transmitter includes: a signal generation circuit configured to generate M×N binary electric signals based on transmission data, bit rates of the M×N binary electric signals being equal to each other, N being an integer larger than one, when the optical transmitter multiplexes N optical signals in time-division multiplexing; a Mach-Zehnder interferometer; and M×N phase-shift elements provided along an optical path of the Mach-Zehnder interferometer and respectively configured to shift phases of light propagated in the optical path corresponding to the M×N binary electric signals. The M×N phase-shift segments are comprised of N electrode groups. Each of the N electrode groups includes M or more electrodes to which corresponding M binary electric signals among the M×N binary electric signals are given.

7 Claims, 20 Drawing Sheets

Related Art

OPTICAL TRANSMITTER FOR TRANSMITTING MULTILEVEL OPTICAL SIGNALS

CROSS-REFERENCE TO RELATED APPLICATION

This application is based upon and claims the benefit of priority of the prior Japanese Patent Application No. 2021-116070, filed on Jul. 14, 2021, the entire contents of which are incorporated herein by reference.

FIELD

The embodiments discussed herein are related to an optical transmitter for transmitting multilevel optical signals.

BACKGROUND

An optical modulator is one of key devices to actualize long-distance/high-capacity optical transmission. For example, the optical modulator generates a modulated optical signal by modulating continuous wave light with an electric signal corresponding to transmission data generated by a digital signal processor (DSP). FIG. 1A illustrates an example of an optical transmitter provided with the optical modulator.

In a configuration illustrated in FIG. 1A, transmission data (digital signal) generated by a DSP is converted into an analog signal by a digital-to-analog converter (DAC). Then, an output signal of the DAC is amplified by an analog driver (linear driver) and is provided to the optical modulator. The optical modulator is provided with optical waveguides constituting a Mach-Zehnder interferometer, and electrodes are formed in the vicinities of the optical waveguide. Continuous wave light is input to the Mach-Zehnder interferometer. Then, when an output signal of the driver is provided to the electrode, a phase of the light propagating through the waveguide is changed corresponding to the signal, and a modulated optical signal representing the transmission data is output. Note that, in the following description, the electrode (i.e., electrode used as a phase shifter) to which is given the electric signal representing the transmission data may be called a "phase-shift segment" or simply a "segment".

In this configuration, in the case of generating an optical signal in which each symbol carries data of 2 bits, the DSP outputs 2-bit parallel data. Then, since a 4-level analog signal is output from the DAC, a PAM4 (4-level Pulse Amplitude Modulation) optical signal is generated. In addition, in order to obtain sufficient optical amplitude in this configuration, as a baud rate is higher, an analog signal with larger amplitude is needed, and therefore, power consumption of the driver is increased.

For example, this problem is relieved by a configuration illustrated in FIG. 1B. In the configuration illustrated in FIG. 1B, an optical modulator is provided with electrodes that respectively correspond to a plurality of bits carried by each symbol. In other words, in the case where each symbol carries data of 2 bits, the optical modulator is provided with electrodes (LSB segments) for a low-order bit, and electrodes (MSB segments) for a high-order bit. Herein, it is assumed that a signal with the same voltage amplitude is input to each segment. In this case, a length of the MSB segment is twice that of the LSB segment. Then, when each segment is provided with a transmission bit corresponding thereto, a PAM4 optical signal is generated. According to this configuration, as compared with the configuration illustrated in FIG. 1A, it is not necessary to increase the amplitude of the electric signal given to the optical modulator, it is thereby possible to use a binary driver through which a current passes only at the time of data transition, and therefore, power consumption is reduced. Note that the modulation scheme illustrated in FIG. 1B may be called "optical DAC", because a digital signal is given to the Mach-Zehnder interferometer to generate an analog signal in the optical domain.

In addition, for example, optical transmission devices or optical transmission circuits provided with the optical modulator are described in Japanese Laid-open Patent Publication No. 2006-195256, Japanese Laid-open Patent Publication No. 2009-027517, U.S. Pat. No. 7,787,713, and Japanese Laid-open Patent Publication No. 2008-219760.

As described above, there are known configurations for generating multilevel optical signals using the DSP and optical DAC. However, there are limitations to increase the speed of the DSP and electric circuit. Therefore, in speedup of transmission data, operation speed of the DSP or electric circuit sometimes becomes a bottleneck.

SUMMARY

According to an aspect of the embodiments, an optical transmitter transmits a modulated optical signal in which each symbol carries M bits. M is an integer larger than one. The optical transmitter includes: a signal generation circuit configured to generate M×N binary electric signals based on transmission data, bit rates of the M×N binary electric signals being equal to each other, N being an integer larger than one, when the optical transmitter multiplexes N optical signals in time-division multiplexing; a Mach-Zehnder interferometer; and M×N phase-shift elements provided along an optical path of the Mach-Zehnder interferometer and respectively configured to shift phases of light propagated in the optical path corresponding to the M×N binary electric signals. The M×N phase-shift segments are comprised of N electrode groups. Each of the N electrode groups includes M or more electrodes to which corresponding M binary electric signals among the M×N binary electric signals are given.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1A:
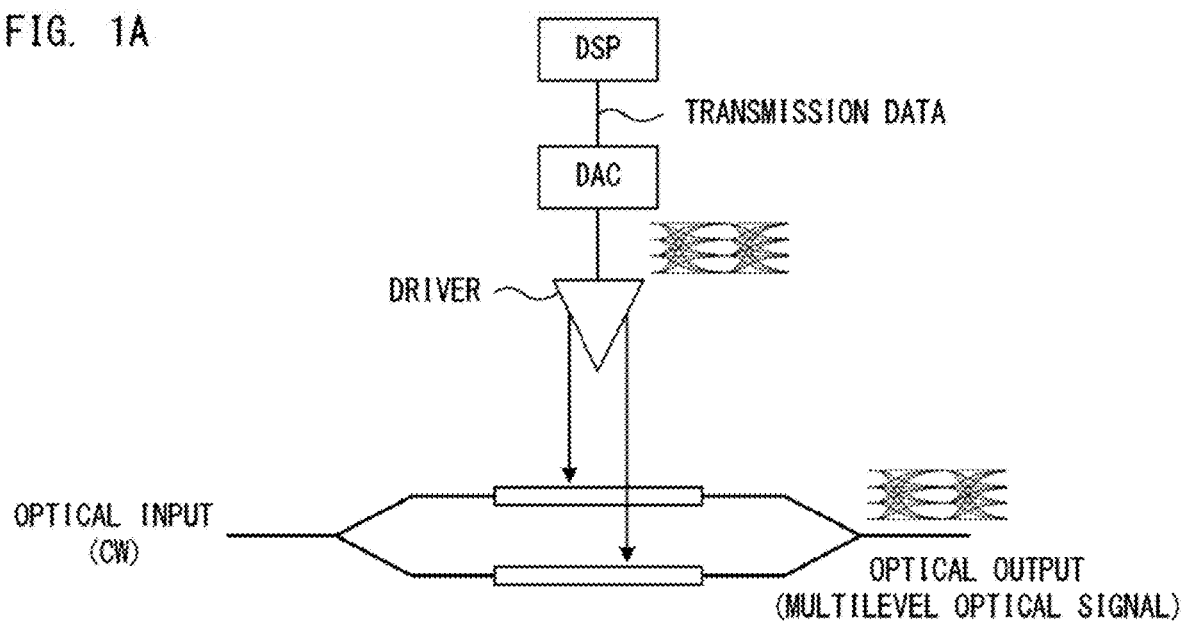
FIGS. 1A and 1B illustrate examples of an optical transmitter provided with an optical modulator.
Figure 1B:
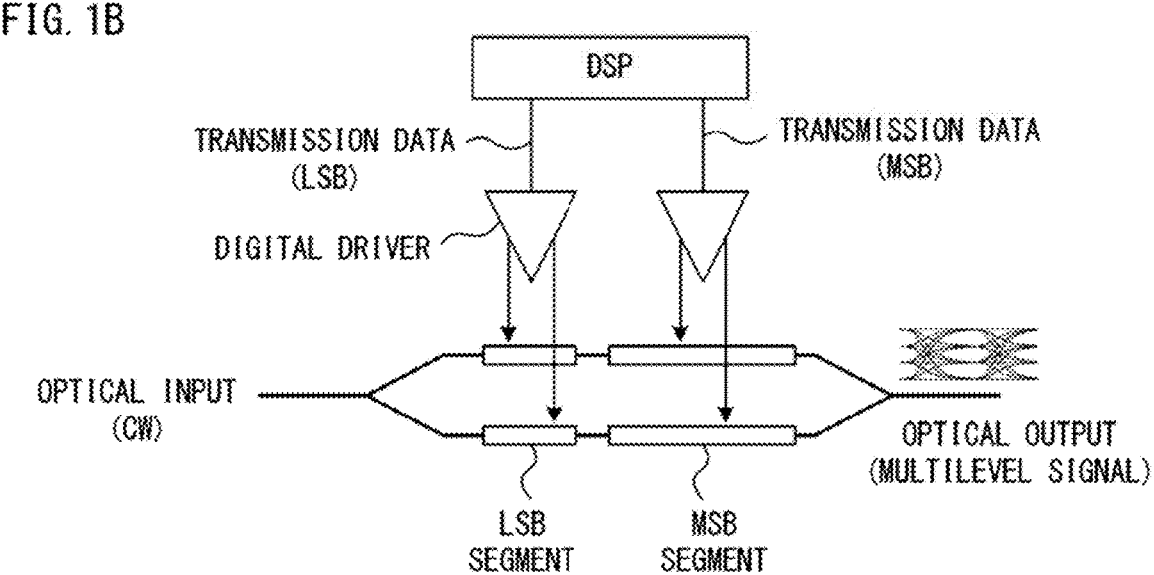
Figure 2:
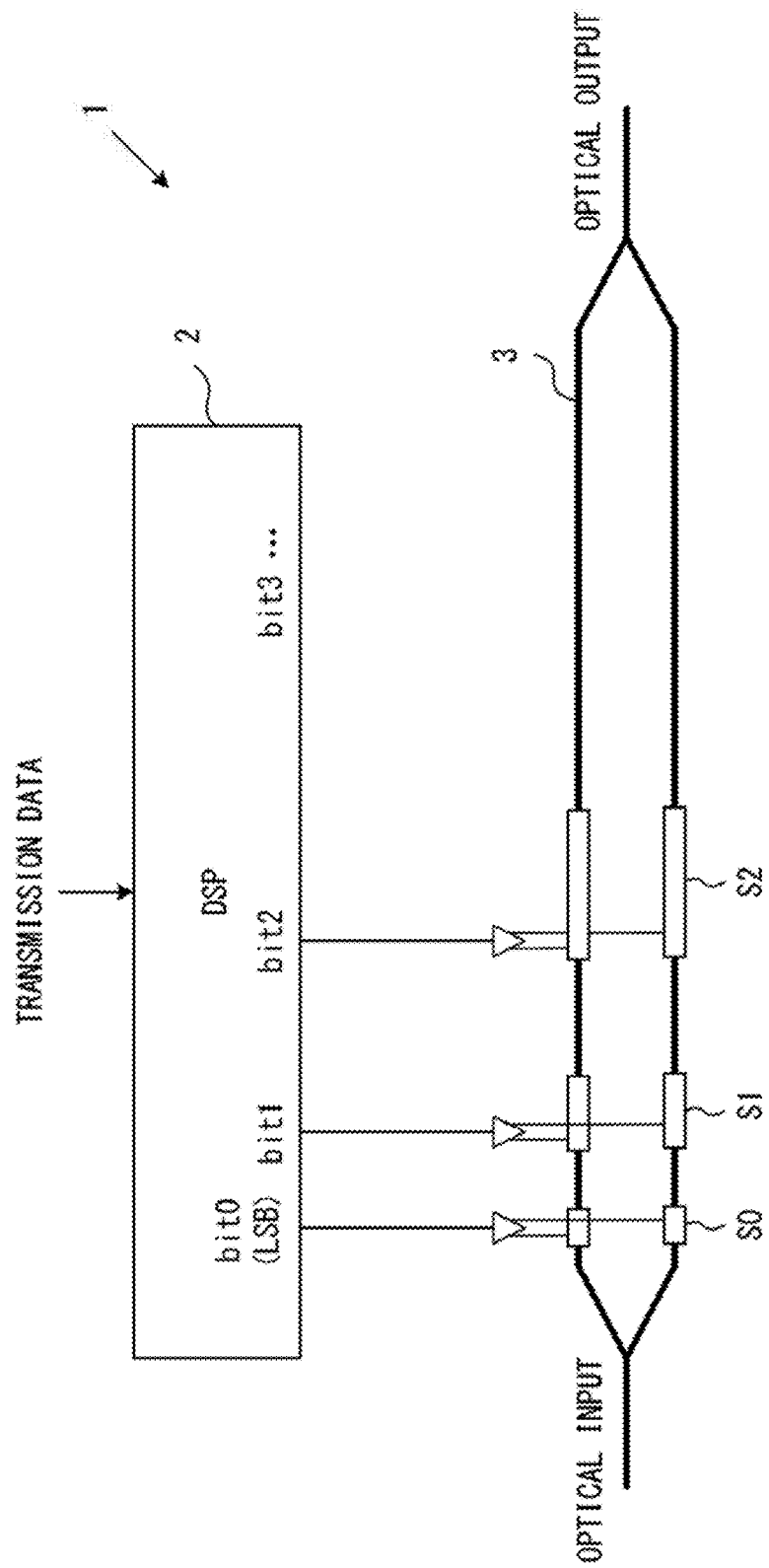
FIG. 2 illustrates an example of an optical transmitter using an optical DAC.

FIG. 2 illustrates an example of an optical transmitter using an optical DAC. In this embodiment, an optical transmitter 1 is provided with a digital signal processor (DSP) 2 and optical modulator 3. The optical transmitter 1 generates a multilevel optical signal in which each symbol carries M bits. For example, the transmitter generates a PAM4 (4-level Pulse Amplitude Modulation) optical signal in M=2, while generating a PAM8 optical signal in M=3. Note that, in the following description, the optical transmitter using the optical DAC may be called an "optical DAC transmitter".

Figure 3:
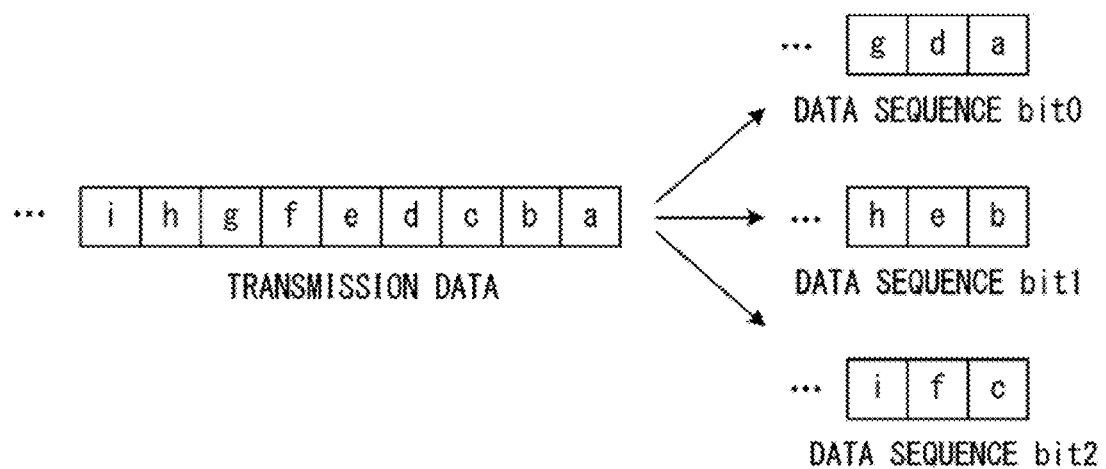
FIG. 3 illustrates an example of a method of allocating transmission data to a plurality of data sequences.

The DSP 2 generates M data sequences from transmission data. For example, when M is 3, as illustrated in FIG. 3, three data sequences bit0 to bit2 are generated. In this example, a bit sequence representing the transmission data is sequentially allocated to the data sequences bit0 to bit2 for each bit. In addition, the method of allocating the transmission data to each data sequence is not limited to the example illustrated in FIG. 3.

The optical modulator 3 is equipped with a Mach-Zehnder interferometer. The Mach-Zehnder interferometer is equipped with an input optical waveguide, P arm optical waveguide, N arm optical waveguide, and output optical waveguide. Input ends of the P arm optical waveguide and N arm optical waveguide are coupled to the input optical waveguide. Accordingly, input light to the optical modulator 3 propagates via the P arm optical waveguide and N arm optical waveguide. Output ends of the P arm optical waveguide and N arm optical waveguide are coupled to the output optical waveguide. Accordingly, output light of the P arm optical waveguide and output light of the N arm optical waveguide is combined and output. In the following description, each of the P arm optical waveguide and N arm optical waveguide may be called an "arm waveguide".

Each arm is provided with electrodes each used as a phase shifter. Specifically, the electrodes are provided respectively with respect to data sequences. For example, in the case where M=3, each arm is provided with electrodes S0 to S2. Then, each of the electrodes S0 to S2 is provided with an electric signal representing a corresponding data sequence. Specifically, an electric signal representing the data sequence bit0 is given to the electrode S0, an electric signal representing the data sequence bit1 is given to the electrode S1, and an electric signal representing the data sequence bit2 is given to the electrode S2.

In the optical modulator 3 with the above-mentioned configuration, when the electric signal is given to the electrode, a refractive index of the arm waveguide changes corresponding to the electric signal. When the refractive index of the arm waveguide changes, a phase of light passing through the arm waveguide changes. In other words, each of the electrodes S0 to S2 works as a phase shifter. Note that the electric signal representing each data sequence is applied to the P arm optical waveguide and N arm optical waveguide as a differential signal.

Herein, a length of the electrode S1 is twice that of the electrode S0, and a length of the electrode S2 is twice that of the electrode S1. Accordingly, a phase shift by the signal given to the electrode S1 is about twice a phase shift by the signal given to the electrode S0. Similarly, a phase shift by the signal given to the electrode S2 is about twice the phase shift by the signal given to the electrode S1.

Further, in this example, intensity of output light of the Mach-Zehnder interferometer is assumed to be proportional to the phase shift in the arm waveguide. Thus, the intensity of output light of the Mach-Zehnder interferometer is controlled by the data sequences bit0 to bit2.

For example, it is assumed that the amplitude of intensity is "1" in output light controlled by a signal bit0 representing the data sequence bit0. In this case, the amplitude of intensity is "2" in output light controlled by a signal bit1 representing the data sequence bit1, and the amplitude of intensity is "4" in output light controlled by a signal bit2 representing the data sequence bit2. Thus, for example, when values of the bit0 to bit2 are "101", the intensity of output light of the Mach-Zehnder interferometer is "5(=1+0+4)". When values of the bit0 to bit2 are "010", the intensity of output light of the Mach-Zehnder interferometer is "2(=0+2+0)". In other words, the PAM8 is realized in response to bit0 to bit2.

In the following description, the electrode (i.e., electrode used as the phase shifter) to which is given the electric signal representing the transmission data may be called a "phase-shift segment" or simply a "segment". In other words, the optical modulator illustrated in FIG. 2 is provided with segments S0 to S2.

Thus, the optical modulator 3 controls a phase of the input light based on the signals bit0 to bit2, and thereby generates an optical signal representing the transmission data. In addition, unless timing of the signals bit0 to bit2 given to respective segments is adjusted properly, quality of the output optical signal degrades. For example, when the timing of the signals bit0 to bit2 given to respective segments is not adjusted properly, a waveform of the output optical signal is distorted. Accordingly, the optical modulator 3 is preferably equipped with a delay circuit to properly adjust the timing of the signals bit0 to bit2 given to respective segments.

Further, the configuration illustrated in FIG. 2 may implement PAM by properly setting a length of an electrode of each segment, but the present invention is not limited to this configuration. For example, the PAM may be implemented by properly setting the number of electrodes. In an example illustrated in FIG. 4, one electrode (S0) is provided for the data sequence bit0, two electrodes (S1a and S1b) are provided for the data sequence bit1, and four electrodes (S2a to S2d) are provided for the data sequence bit2. In this case, lengths of respective electrodes are equal to each other.

Figure 5:
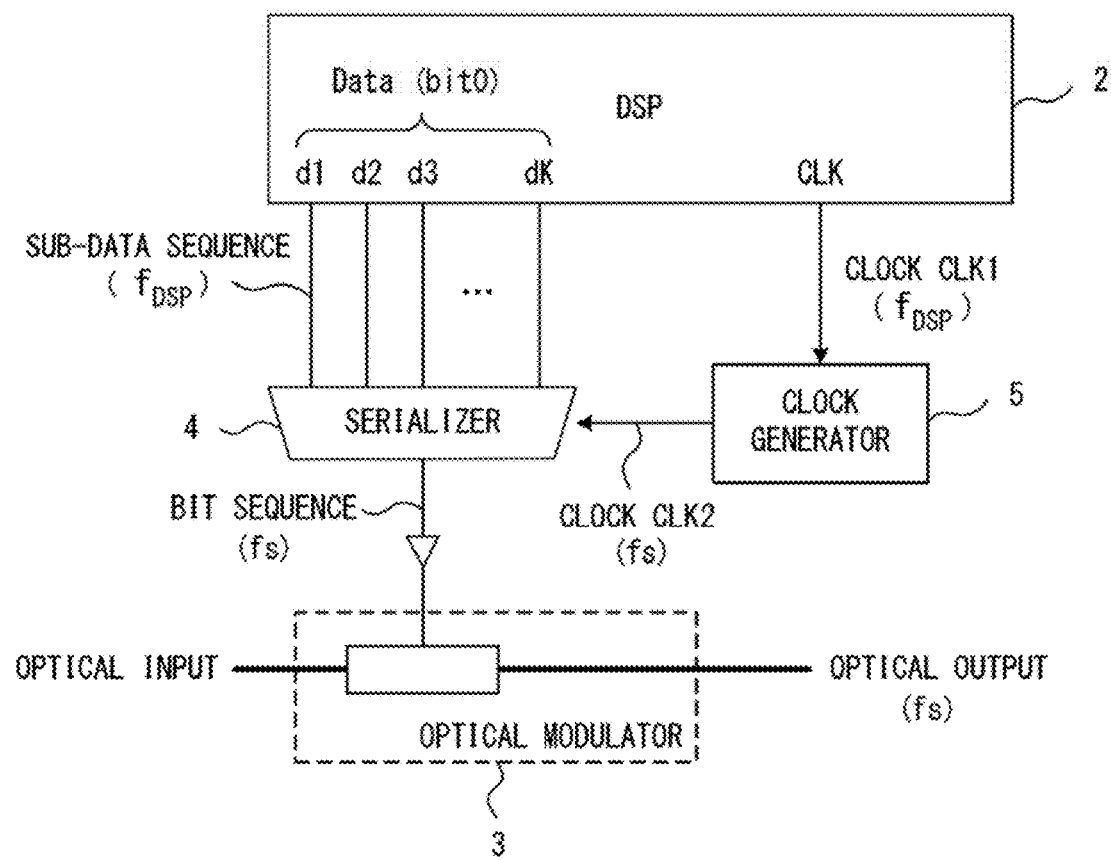
FIG. 5 illustrates an example of a configuration for realizing increases in speed of the optical DAC.

FIG. 5 illustrates an example of a configuration for realizing speedup of the optical DAC. In this example, each data sequence (bit0 to bit2) is parallelized to make K sub-data sequences. K is an arbitrary integer of "2" or more. Further, data lengths of the K sub-data sequences are equal to each other. In other words, bit rates of the K sub-data sequences are equal to each other. Note that, in FIG. 5, although only the data sequence bit0 is illustrated, each of the other data sequences is also parallelized to make K sub-data sequences.

A DSP 2 operates in synchronization with a frequency $f_{DSP}$ clock. In this case, a symbol rate of each sub-data sequence is $f_{DSP}$. Then, each sub-data sequence is guided to a serializer 4. Further, a clock generator 5 generates a clock signal CLK2 from a clock signal CLK1 output from the DSP 2. A frequency of the clock signal CLK1 is $f_{DSP}$, and a frequency of the clock signal CLK2 is fs. For example, the frequency fs is K times the frequency $f_{DSP}$. Alternatively, as one example, the frequency $f_{DSP}$ is 1 GHz, and the frequency fs is 64 GHz.

The serializer 4 converts the K sub-data sequences into a serial bit sequence, using the clock signal CLK2. By doing this, a bit sequence with the symbol rate (or, bit rate) being fs is obtained. Then, after amplifying by using a binary driver, the bit sequence is given to the corresponding segment provided in the optical modulator 3. Accordingly, according to the configuration illustrated in FIG. 5, it is possible to decrease operation speed of the DSP 2.

In recent years, it has been required to obtain ultrahigh-speed optical transmission of the order of 1 Tbps. In order to realize such ultrahigh-speed optical transmission, in addition to increasing the number of bits carried by each symbol, it is considered that a sampling rate of the order of 100 Giga symbol/sec is required. Therefore, the embodiment of the present invention provides both of modulation schemes in which each symbol carries a plurality of bits and high sampling rates by time-division multiplexing.

Figure 6:
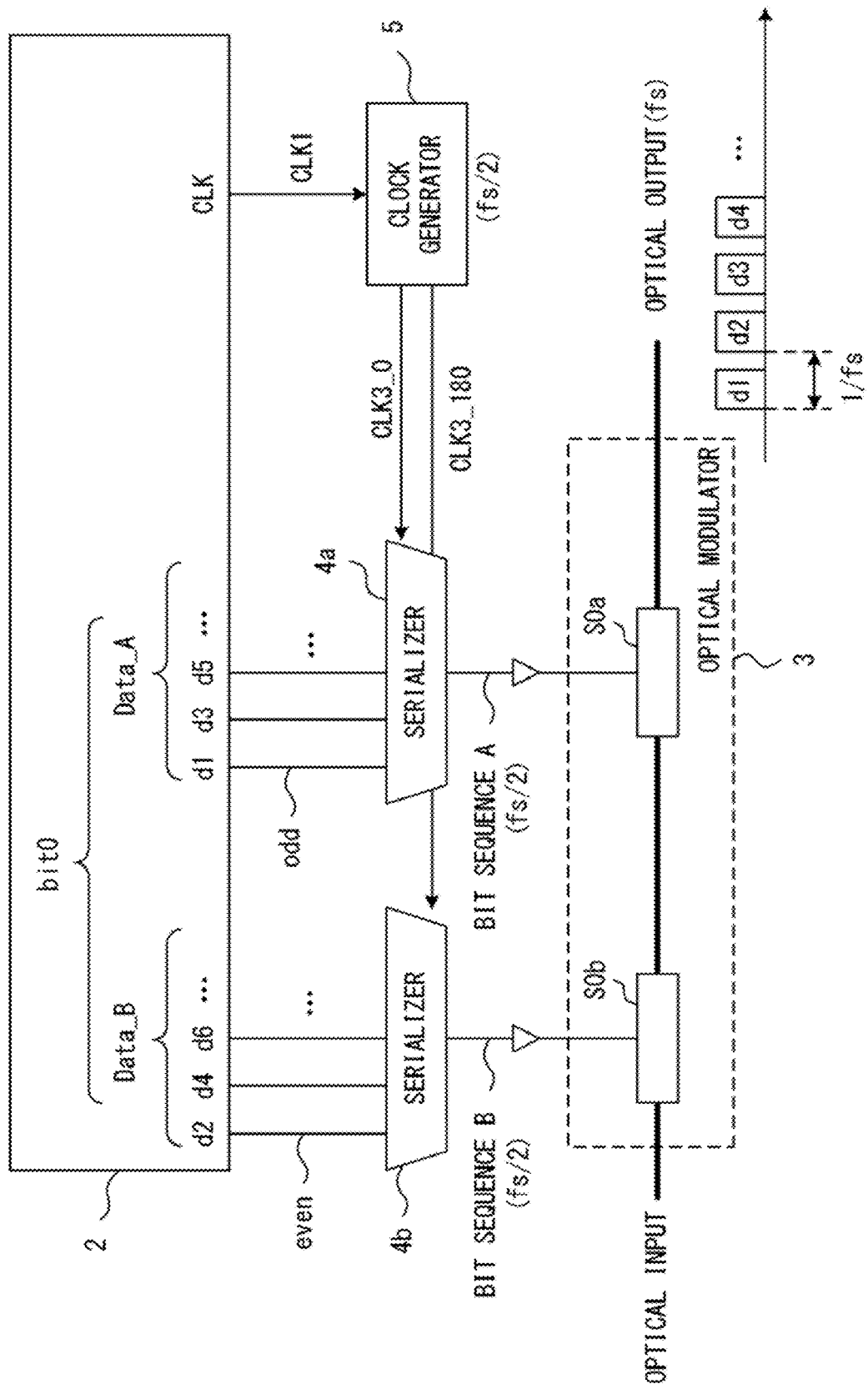
FIG. 6 illustrates an example of an optical transmitter according to an embodiment of the present invention.

FIG. 6 illustrates an example of an optical transmitter according to the embodiment of the present invention. In this embodiment, in addition to parallelization illustrated in FIG. 5, further speedup of the optical transmitter is realized by using time-division multiplexing.

In a configuration illustrated in FIG. 6, data sequences bit0 to bit2 are generated from transmission data, and N×K sub-data sequences are generated from each of the data sequences bit0 to bit2. Herein, N represents the number of optical signals that are multiplexed in time-division multiplexing by the optical modulator 3. K is an arbitrary integer of "2" or more. Data lengths of the N×K sub-data sequences are equal to each other. In other words, bit rates of the N×K sub-data sequences are equal to each other.

Figure 7:
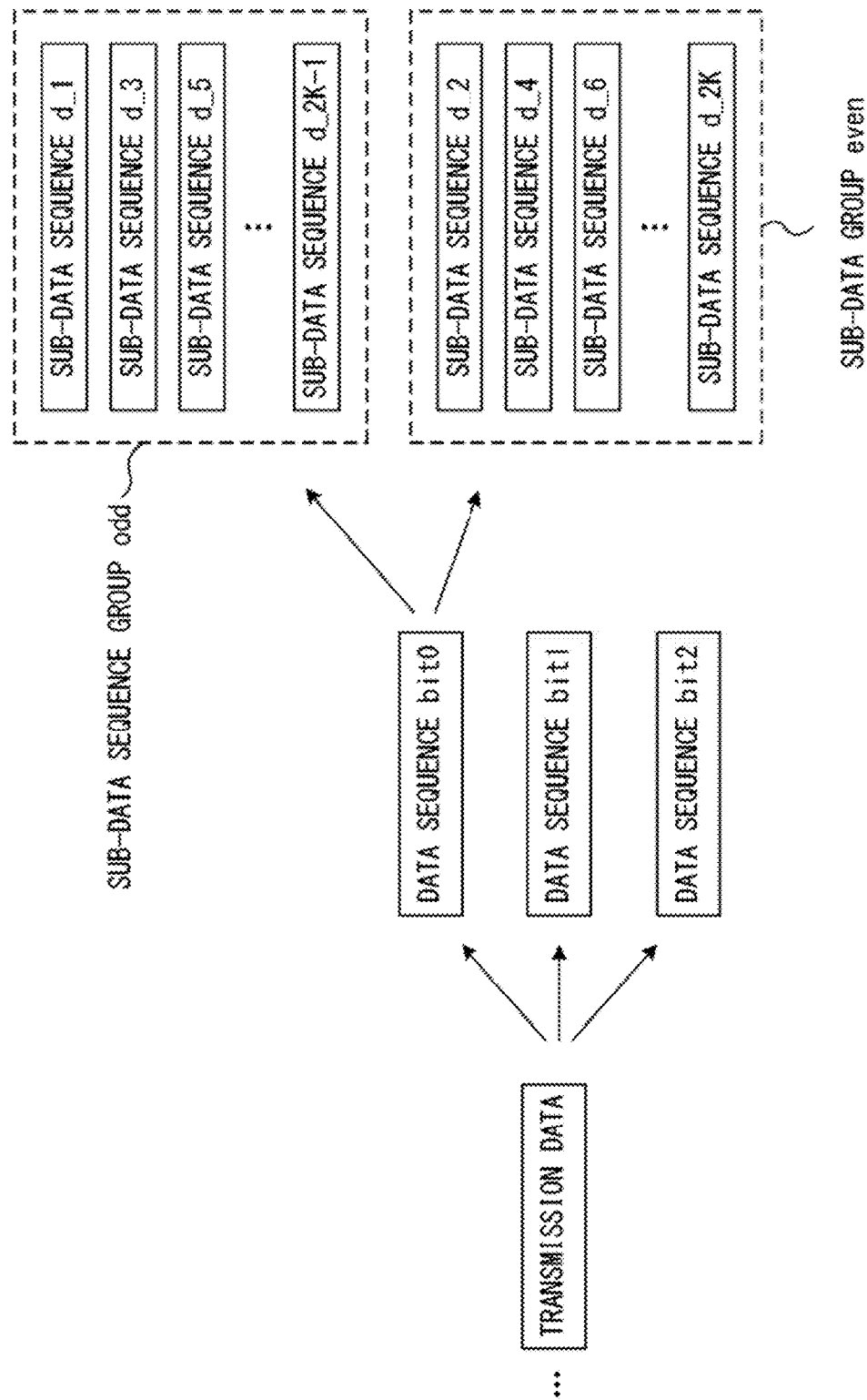
FIG. 7 illustrates an example of a method of generating data sequences and sub-data sequences from transmission data.

The N×K sub-data sequences are grouped into N sub-data sequence groups. In this example, N is "2". In other words, 2K sub-data sequences are grouped into 2 sub-data sequence groups. Herein, it is assumed that the 2K sub-data sequences are identified by serial numbers "1" to "2K". In this case, as illustrated in FIG. 7, one of the sub-data sequence groups is comprised of sub-data sequences (1, 3, 5, . . . , 2K−1) where the serial numbers are odd numbers. Further, the other sub-data sequence group is comprised of sub-data sequences (2, 4, 6, . . . , 2K) where the serial numbers are even numbers. Accordingly, in the following description, the sub-data sequence group comprised of sub-data sequences where the serial numbers are odd numbers may be called a "sub-data sequence group odd". Further, the sub-data sequence group comprised of sub-data sequences where the serial numbers are even numbers may be called a "sub-data sequence group even". Then, the sub-data sequences 1, 3, 5, . . . constituting the sub-data sequence group odd are guided to a serializer 4a. Further, the sub-data sequences 2, 4, 6, . . . constituting the sub-data sequence group even are guided to a serializer 4b.

The clock generator 5 generates a clock signal CLK3 from the clock signal CLK1 output from the DSP 2. In addition, a frequency of the clock signal CLK3 is one-Nth the frequency of the clock signal CLK2 generated in the configuration illustrated in FIG. 5. In this embodiment, since N=2, when the frequency of the clock signal illustrated in FIG. 5 is fs, the frequency of the clock signal CLK3 is fs/2. Further, the clock generator 5 outputs N clock signals CLK3 where phases are mutually shifted by 2π/N. In this embodiment, since N=2, the generator 5 outputs two clock signals (CLK3_0, CLK3_180) where the phases are mutually shifted by π.

The serializer 4a serializes the sub-data sequences d1, d3, d5, . . . using the clock signal CLK3_0. In other words, the serializer 4a selects and outputs data every one bit sequentially from the sub-data sequences d1, d3, d5, . . . , in synchronization with the clock signal CLK3_0. By this means, a bit sequence A illustrated in FIG. 6 is generated. Similarly, the serializer 4b serializes the sub-data sequences d2, d4, d6, . . . using the clock signal CLK3_180. In other words, the serializer 4b selects and outputs data every one bit sequentially from the sub-data sequences d2, d4, d6, . . . , in synchronization with the clock signal CLK3_180. By this means, a bit sequence B illustrated in FIG. 6 is generated. Symbol rates (or, bit rates) of the bit sequences A and B are equal to each other, and are fs/2.

Figure 4:
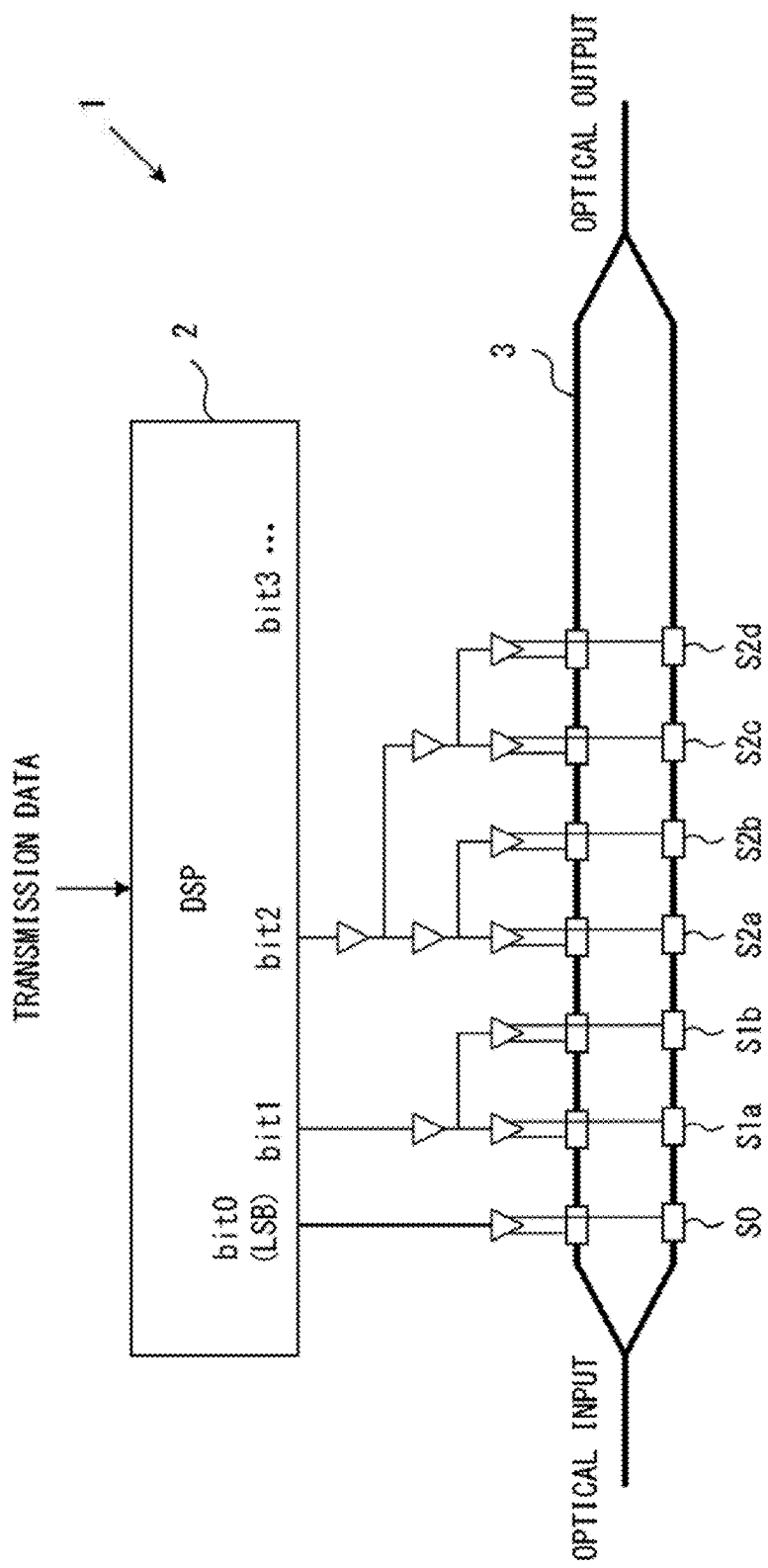
FIG. 4 illustrates another example of the optical transmitter using the optical DAC.

As explained with reference to FIG. 2 or 4, the optical modulator 3 is provided with the electrode working as the phase shifter with respect to each of the data sequences bit0 to bit2. In addition, in the configuration illustrated in FIG. 6, with respect to each of the data sequences bit0 to bit2 are provided an electrode to which the bit sequence A is given and another electrode to which the bit sequence B is given. For example, with respect to the data sequence bit0 are provided an electrode S0a to which the bit sequence A is given, and an electrode S0b to which the bit sequence B is given. This manner is similar to the other bit sequences bit1 and bit2. Accordingly, in the case where each transmission symbol carries M bits, and the number of optical signals multiplexed by time-division multiplexing in the optical modulator 3 is N, the optical modulator 3 is equipped with M×N phase-shift segments. For each phase-shift segment, one electrode is provided in the configuration illustrated in FIG. 2, and one or more electrodes are provided in the configuration illustrated in FIG. 4. Accordingly, the optical modulator 3 is provided with M×N electrodes or more.

When a first symbol (i.e., data d1) of the bit sequence A is given to the electrode S0a, light passing through the Mach-Zehnder interferometer is modulated corresponding to the data d1. When a first symbol (i.e., data d2) of the bit sequence B is given to the electrode S0b, light passing through the Mach-Zehnder interferometer is modulated corresponding to the data d2. Next, when a second symbol (i.e., data d3) of the bit sequence A is given to the electrode S0a, light passing through the Mach-Zehnder interferometer is modulated corresponding to the data d3. When a second symbol (i.e., data d4) of the bit sequence B is given to the electrode S0b, light passing through the Mach-Zehnder interferometer is modulated corresponding to the data d4. Hereinafter, similarly, modulated optical signals are generated corresponding to the bit sequences A and B.

Herein, a phase of the clock signal CLK3_180 for generating the bit sequence B is shifted by 180 degrees with respect to a phase of the clock signal CLK3_0 for generating the bit sequence A. In other words, timing at which the serializer 4b outputs the bit sequence B using the clock signal CLK3_180 is shifted by one-half a period of the clock signal CLK3 with respect to timing at which the serializer 4a outputs the bit sequence A using the clock signal CLK3_0. Specifically, the timing at which the serializer 4b outputs the bit sequence B is shifted by 1/fs with respect to the timing at which the serializer 4a outputs the bit sequence A. Accordingly, as illustrated in FIG. 6, the optical modulator 3 generates alternately modulated components by the bit sequence A (d1, d3, d5, . . . ) and modulated components by the bit sequence B (d2, d4, d6, . . . ). As a result, time-division multiplexing (or, time-division interleave) of the bit sequences A and B is actualized.

In FIGS. 6 and 7, time-division multiplexing is explained for the data sequence bit0, and similar time-division multiplexing is actualized also for the other data sequences (bit1, bit2). Herein, it is assumed that the timing of electric signals representing the bit sequences bit0 to bit2 is properly adjusted by a delay circuit not illustrated in the figure. As a result, amplitude multiplexing of the data sequences bit0 to bit2 is actualized to generate the PAM8 optical signal.

Thus, as compared with the configuration illustrated in FIG. 5, in the configuration illustrated in FIG. 6, the frequency of the clock signal generated by the clock generator 5 is a half. In addition, in the configuration illustrated in FIG. 6, two sub-data sequence groups A and B are multiplexed, and when N sub-data sequence groups are multiplexed, as compared with the configuration illustrated in FIG. 5, in the configuration illustrated in FIG. 6, the frequency of the clock signal generated by the clock generator 5 is one-Nth. Accordingly, requirements of operation speed required for the clock generator 5 are relaxed. Alternatively, when the upper limit operation frequency of the clock generator 5 is fs, a transmission rate of N×fs is actualized.

Then, by using the above-mentioned time-division multiplexing, further speedup of the optical transmitter is actualized. In addition, in order to actualize time-division multiplexing, it is necessary to adjust, with accuracy, timing at which each electric signal (herein, binary electric signal representing the bit sequence A and binary electric signal representing the bit sequence B) is given to the corresponding electrode. In this case, it is necessary to consider propagation time of light inside the Mach-Zehnder interferometer.

Figure 8:
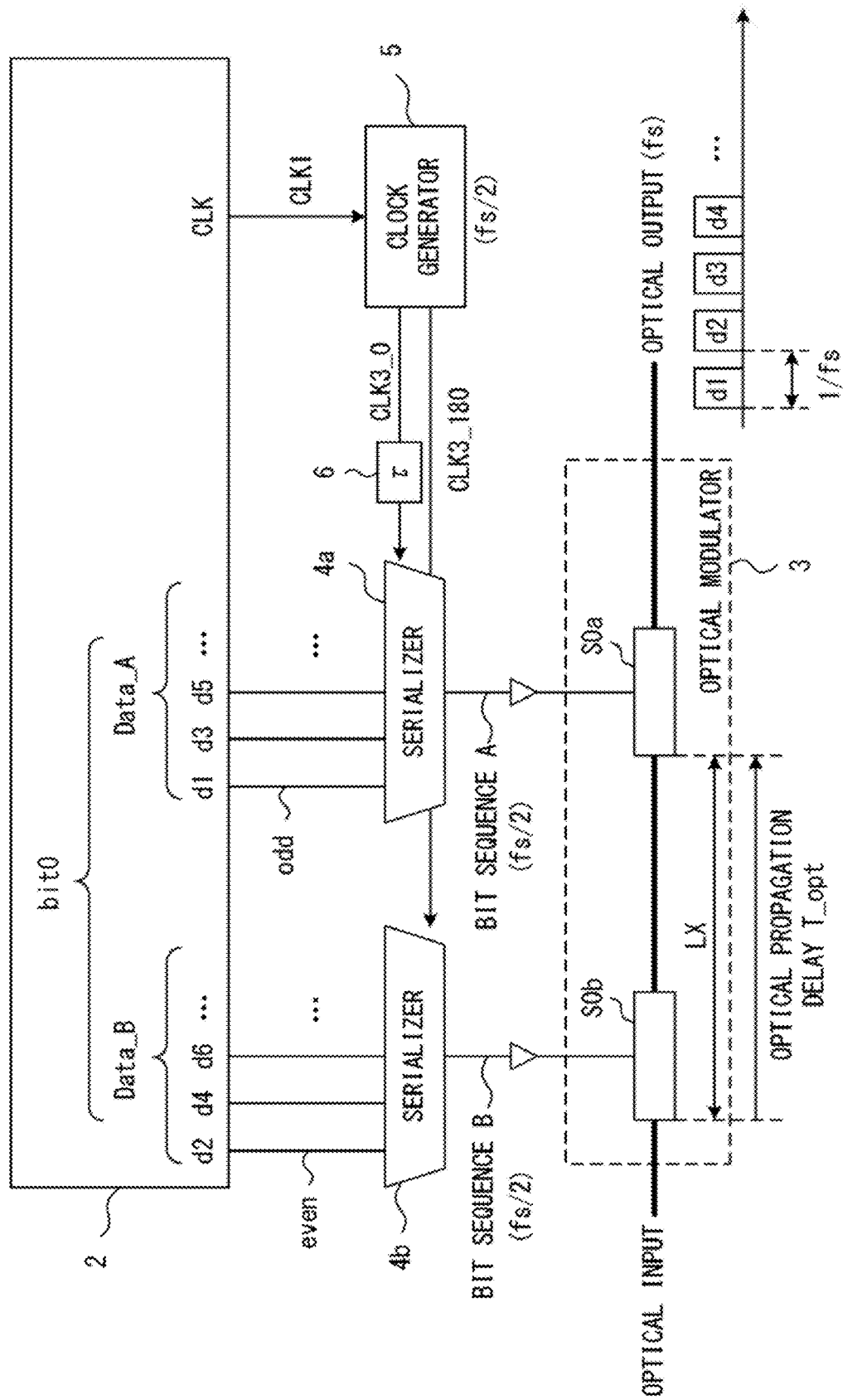
FIG. 8 illustrates an example of an optical transmitter provided with a delay circuit in consideration of propagation time of light.

FIG. 8 illustrates an example of an optical transmitter equipped with a delay circuit in consideration of propagation time of light. In this embodiment, a distance between an electrode S0b and an electrode S0a is LX. Then, optical propagation delay $T_{opt}$ occurs between the electrode S0b and the electrode S0a.

Figure 9A:
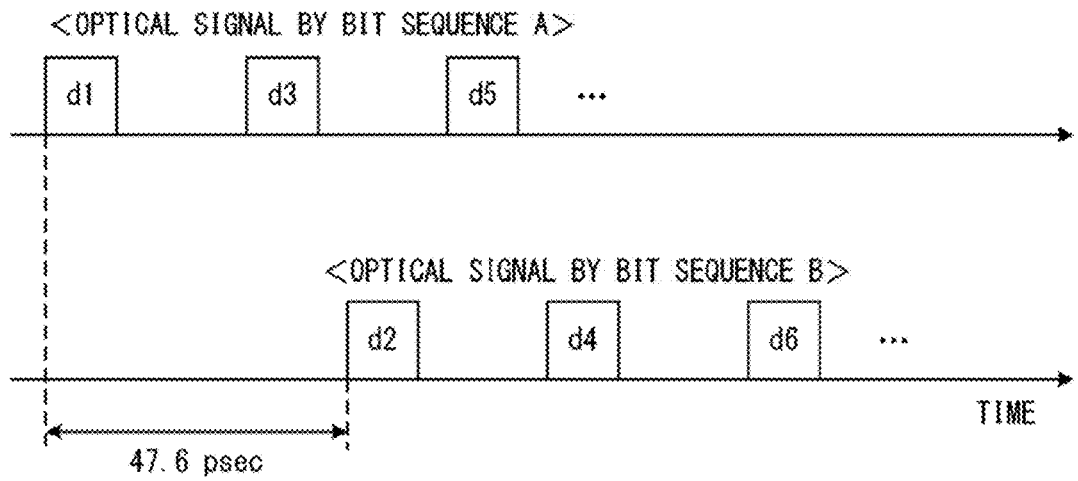
FIGS. 9A to 9C illustrate an example of optical signals generated in the optical modulator of the optical transmitter illustrated in FIG. 8.
Figure 9B:
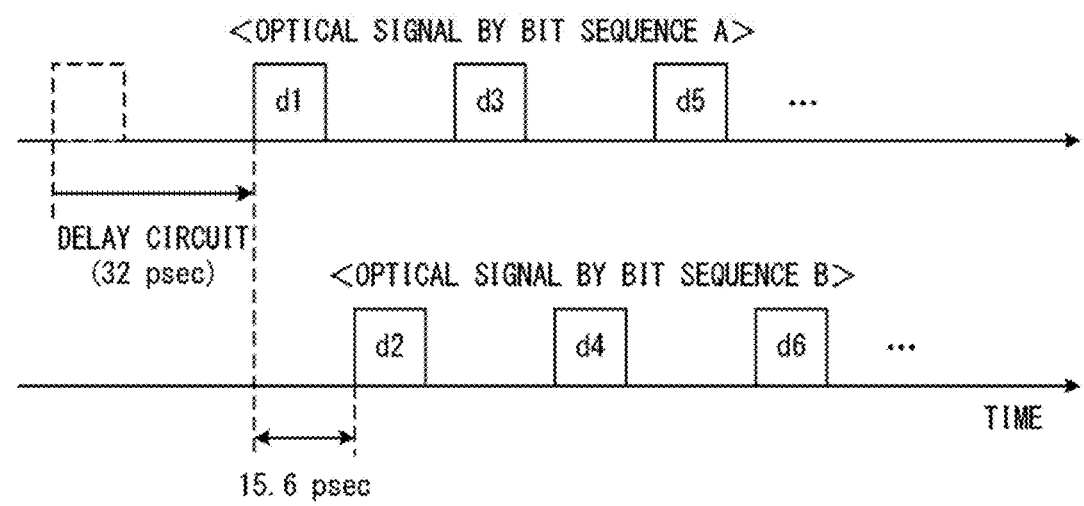
Figure 9C:
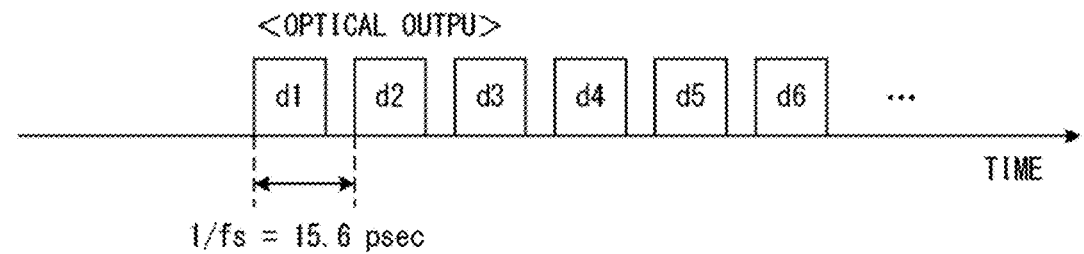

FIGS. 9A-9C illustrate an example of optical signals generated in an optical modulator of the optical transmitter illustrated in FIG. 8. Herein, when a delay circuit 6 illustrated in FIG. 8 is not provided, as illustrated in FIG. 9A, it is assumed that the optical signal representing the bit sequence B is delayed by 47.6 psec with respect to the optical signal representing the bit sequence A. On the other hand, in order to actualize time-division multiplexing of the bit sequences A and B, as illustrated in FIG. 9C, a state is required where the optical signal representing the bit sequence B is delayed by "1/fs" with respect to the optical signal representing the bit sequence A. "fs" represents a sampling frequency of the optical signal output from the optical modulator 3. Herein, in the case where the sampling frequency fs is 64 GHz, a length (i.e., 1/fs) of a time slot of time-division multiplexing is 15.6 psec. Accordingly, in this case, a state is required where the optical signal representing the bit sequence B is delayed by 15.6 psec with respect to the optical signal representing the bit sequence A.

In the configuration illustrated in FIG. 8, the optical transmitter is equipped with the delay circuit 6. In this example, a clock signal CLK_0 given to the serializer 4a is delayed by the delay circuit 6. On the other hand, a clock signal CLK_180 is given to the serializer 4b without passing through a delay circuit.

The delay time of the delay circuit 6 is designed to satisfy the above-mentioned condition. Accordingly, as illustrated in FIG. 9B, the delay circuit 6 delays the clock signal CLK_0 given to the serializer 4a by 32 psec. Then, in the optical modulator 3, the state is actualized where the optical signal representing the bit sequence B is delayed by 15.6 psec with respect to the optical signal representing the bit sequence A. As a result, time-division multiplexing illustrated in FIG. 9C is actualized.

Thus, by properly adjusting timing of the clock signal given to the serializer using the delay circuit, it is possible to actualize accurate time-division multiplexing. In addition, for example, the delay circuit 6 is actualized by an amplifying circuit. Therefore, by providing the delay circuit 6, power consumption is increased in the optical transmitter. Further, when the delay circuit 6 is provided, the quality (e.g., jitter characteristics) of the optical signal output from the optical transmitter may deteriorate. Accordingly, it is preferable that the optical transmitter is not equipped with the delay circuit 6 for adjusting timing of the clock signal given to the serializer.

Figure 10:
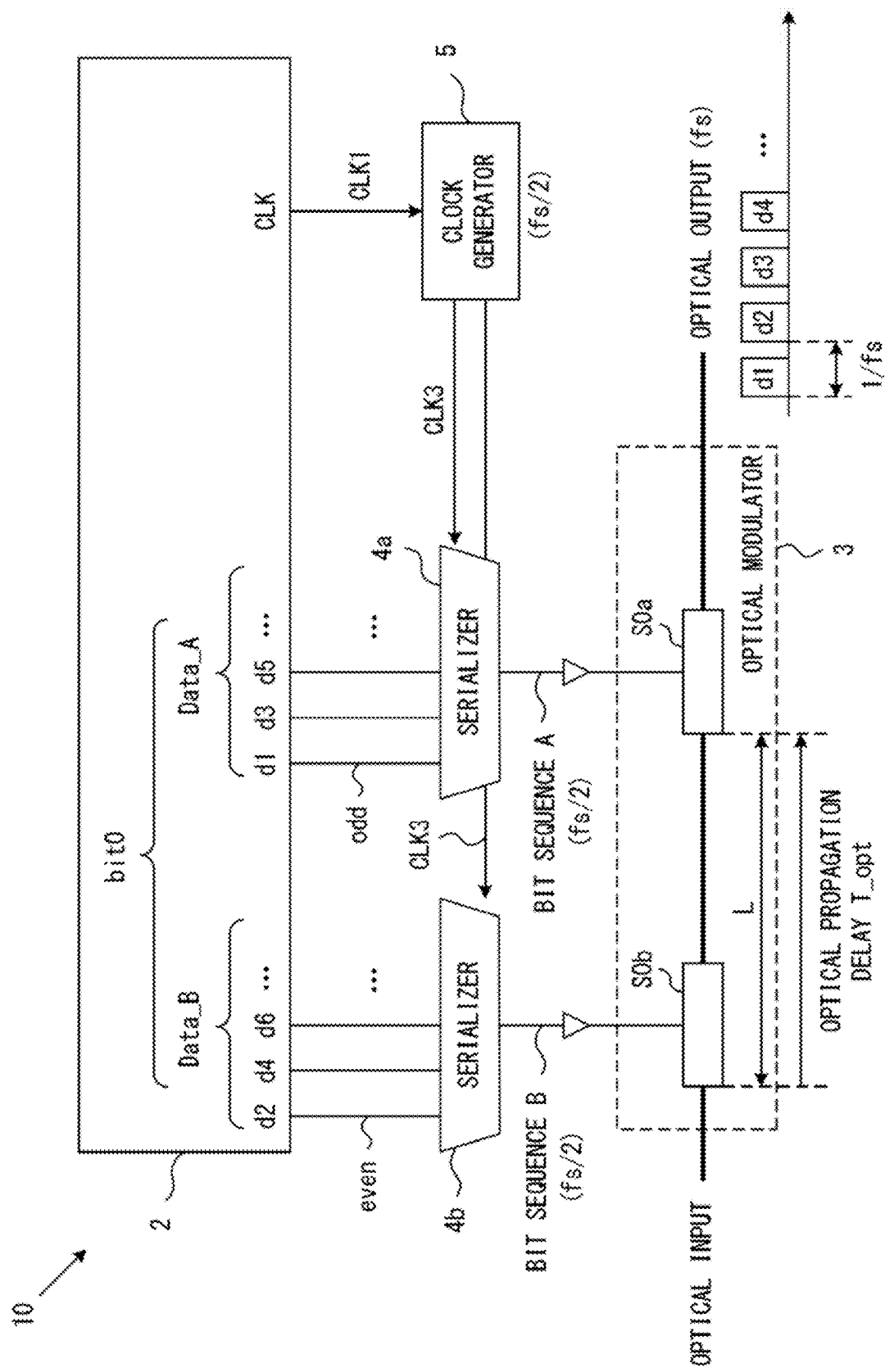
FIG. 10 illustrates another example of the optical transmitter according to the embodiment of the present invention.

FIG. 10 illustrates another example of the optical transmitter according to the embodiment of the present invention. In this embodiment, an optical transmitter 10 is equipped with the DSP 2, the optical modulator 3, the serializers 4a, 4b, and the clock generator 5, as in the configuration illustrated in FIG. 6 or 8. In addition, FIG. 10 illustrates a configuration to process the data sequence bit0 that is the least significant bit, and omits configurations to process the data sequences (data sequences bit1 and bit2 in FIGS. 2-4) of high-order bits. In the following description is explained the configuration to process the data sequence bit0 of the least significant bit.

In this embodiment, the clock signal CLK3 generated by the clock generator 5 is given to the serializers 4a and 4b. In other words, the serializers 4a and 4b output data in synchronization with the same clock signal.

It is assumed that the propagation time of a signal between the DSP 2 and the electrode S0a and the propagation time of a signal between the DSP 2 and the electrode S0b is equal to each other. In other words, wiring is designed so that the propagation time of the signal between the DSP 2 and the electrode S0a and the propagation time of the signal between the DSP 2 and the electrode S0b is equal to each other. Further, it is assumed that the propagation time of the clock signal between the clock generator 5 and the serializer 4a and the propagation time of the clock signal between the clock generator 5 and the serializer 4b is equal to each other. In other words, wiring is designed so that the propagation time of the clock signal between the clock generator 5 and the serializer 4a and the propagation time of the clock signal between the clock generator 5 and the serializer 4b is equal to each other.

In the optical transmitter 10, instead of providing the delay circuit 6 illustrated in FIG. 8, by properly determining a distance between electrodes working as phase shifters, time-division multiplexing is actualized. In other words, time-division multiplexing is actualized, by properly determining a distance between segments.

Figure 11A:
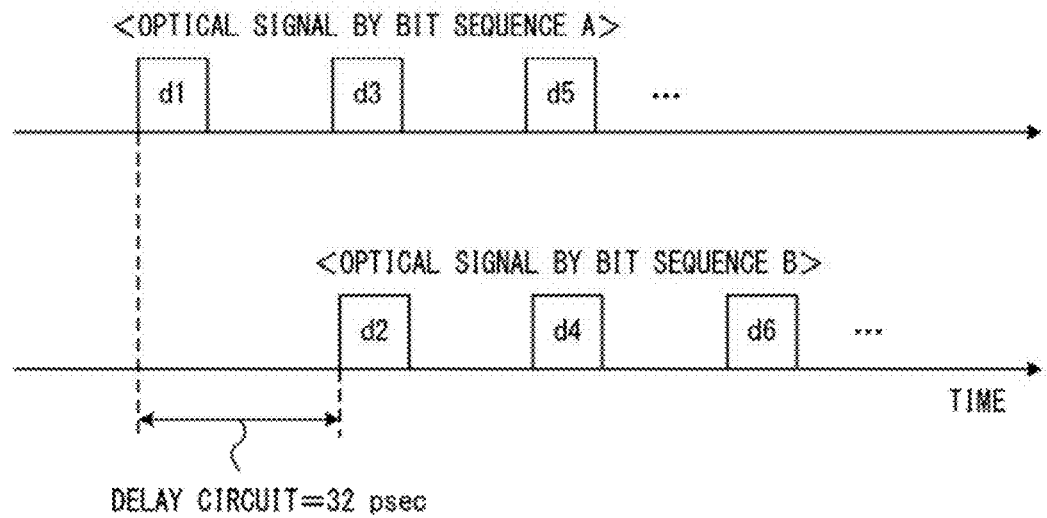
FIGS. 11A to 11C illustrate an example of optical signals generated in the optical modulator of the optical transmitter illustrated in FIG. 10.
Figure 11B:
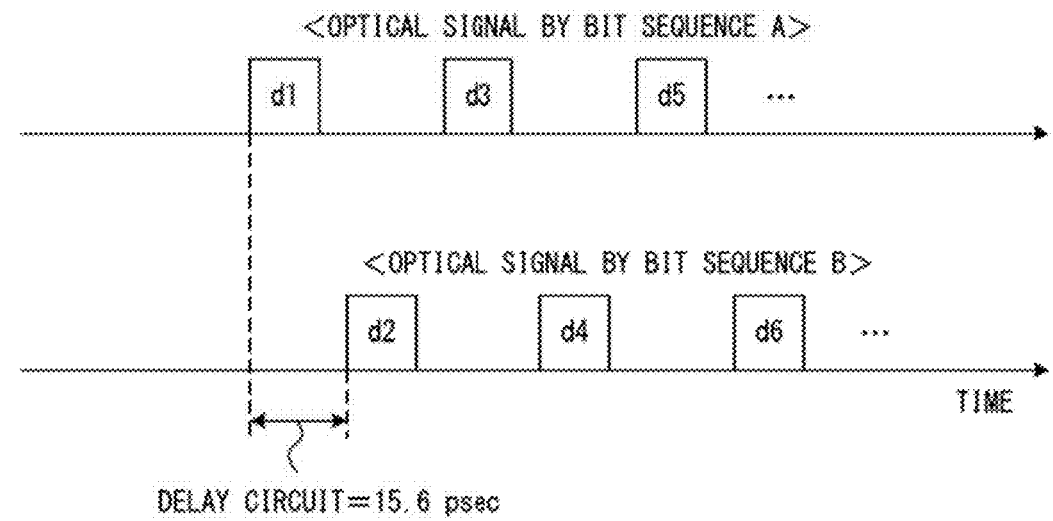
Figure 11C:
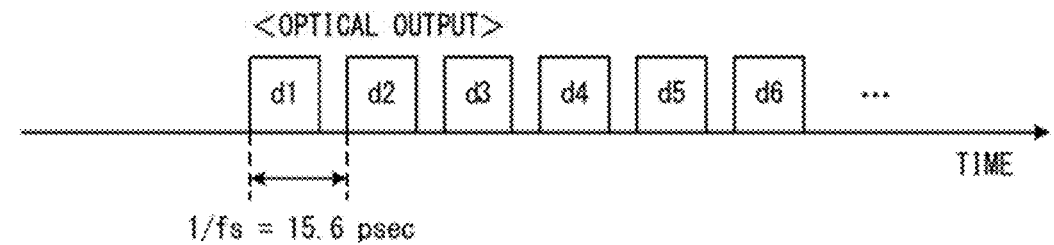

FIGS. 11A-11C illustrate an example of optical signals generated in the optical modulator 3 of the optical transmitter 10 illustrated in FIG. 10. In addition, it is assumed that the sampling frequency fs of the optical signal output from the optical modulator 3 is 64 GHz.

FIG. 11A illustrates an example of the optical signal generated in a configuration where a distance between segments is not properly determined. Herein, a distance L between the electrode S0a and the electrode S0b is 2.5 mm. In this case, the optical propagation time $T_{opt}$ required to transmit light from the electrode S0b to the electrode S0a via an optical waveguide is expressed by the following equation. "ng" represents a group refractive index of the optical waveguide constituting the Mach-Zehnder interferometer, and in this embodiment, is 3.84. "c" represents light velocity in a vacuum.

$$T_{opt}=L \times ng/c$$

Accordingly, in the case where timing at which a signal (e.g., d1) of the bit sequence A arrives at the electrode S0a coincides with timing at which a signal (e.g., d2) of the bit sequence B arrives at the electrode S0b, with respect to the optical signal representing the bit sequence A, the optical signal representing the bit sequence B delays by $T_{opt}$. In this example, in the case where the distance L is 2.5 mm, the optical propagation time $T_{opt}$ is 32 psec.

Herein, in order to actualize time-division multiplexing of the bit sequences A and B with accuracy, as illustrated in FIG. 11C, a state is required where the optical signal representing the bit sequence B is delayed by "1/fs" with respect to the optical signal representing the bit sequence A. "fs" represents a sampling frequency of the optical signal output from the optical modulator 3. Herein, in the case where the sampling frequency fs is 64 GHz, a length (i.e., 1/fs) of a time slot of time-division multiplexing is 15.6 psec. Accordingly, in this case, a state is required where the optical signal representing the bit sequence B is delayed by 15.6 psec with respect to the optical signal representing the bit sequence A.

In the optical transmitter 10, the distance between segments is determined to satisfy the above-mentioned condition. Specifically, the distance L is determined so that the optical propagation time $T_{opt}$ required to transmit light from the electrode S0b to the electrode S0a via the optical waveguide is 15.6 psec. In this embodiment, when the distance L is 1.23 mm, the optical propagation time $T_{opt}$ is 15.6 psec. Accordingly, in the optical transmitter 10, the distance L between the electrode S0a and the electrode S0b is 1.23 mm. In this case, as illustrated in FIG. 11B, when timing at which the signal (e.g., d1) of the bit sequence A arrives at the electrode S0a coincides with timing at which the signal (e.g., d2) of the bit sequence B arrives at the electrode S0b, with respect to the optical signal representing the bit sequence A, the optical signal representing the bit sequence B delays by 15.6 psec (i.e., 1/fs). As a result, time-division multiplexing illustrated in FIG. 11C is actualized.

Figure 12:
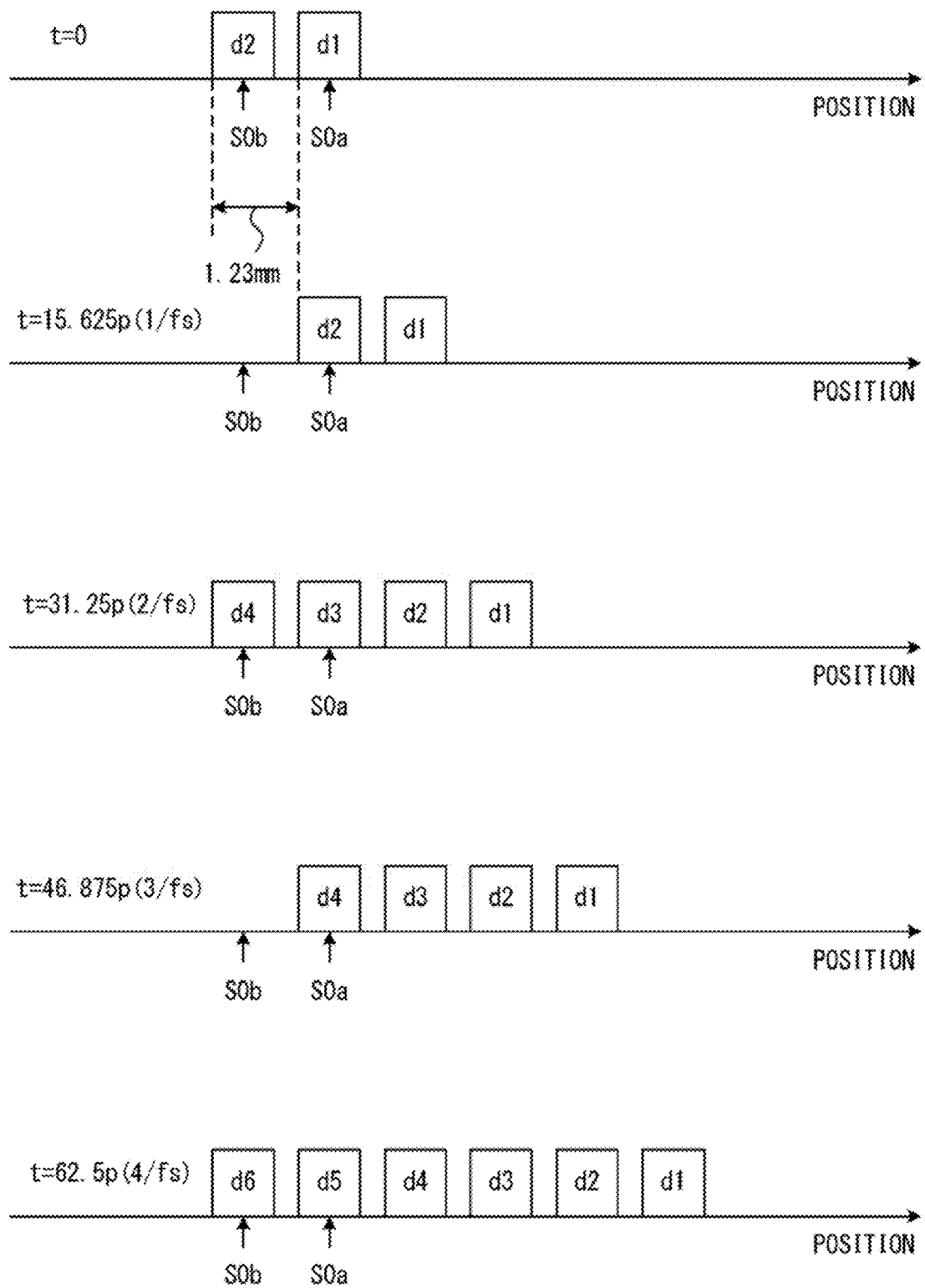
FIG. 12 illustrates an example of time-division multiplexing of optical signals.

FIG. 12 illustrates an example of time-division multiplexing of optical signals. In addition, the horizontal axis represents a position in a propagation direction of light inside the Mach-Zehnder interferometer. "S0a" and "S0b" represent positions in which the electrodes S0a and S0b are respectively provided. Further, the sampling frequency fs is 64 GHz, and a frequency of the clock signal CLK3 given to the serializers 4a, 4b is "fs/2 (32 GHz)". The distance L between the electrode S0a and the electrode S0b is 1.23 mm. Then, at time 0, it is assumed that the signal d1 of the bit sequence A arrives at the electrode S0a, and that the signal d2 of the bit sequence B arrives at the electrode S0b. In addition, in the following description, an optical signal generated by a signal di (i=1, 2, . . . ) may be called an optical signal di.

After a lapse of one time period since time 0, the optical signals d1 and d2 propagate by 1.23 mm respectively from the electrodes S0a and S0b. In addition, one time period means a length (or, 1/fs) of a time slot of time-division multiplexing, and in this embodiment, is 15.625 psec. After a lapse of two time periods since time 0, the optical signals d1 and d2 propagate by 2.46 mm respectively from the electrodes S0a and S0b. At this point, signals d3 and d4 arrive at the electrodes S0a and S0b, and optical signals d3 and d4 are generated, respectively. By this means, optical signals d1-d4 are obtained. Hereinafter, similarly, new electric signals arrive at the electrodes S0a and S0b every two time periods, and corresponding optical signals are generated, respectively. As a result, time-division multiplexing is actualized in bit sequences A and B.

Thus, the optical transmitter 10 illustrated in FIG. 10 is not provided with the delay circuit 6 illustrated in FIG. 8. Accordingly, as compared with the configuration illustrated in FIG. 8, power consumption is decreased in the optical transmitter 10. In addition thereto, as compared with the configuration illustrated in FIG. 8, the quality (e.g., jitter characteristics) is improved in the optical signal output from the optical transmitter 10.

FIGS. 13A to 14D illustrate an example of a simulation of operation of the optical transmitter 10. Herein, a result of the simulation will be illustrated based on a model illustrated in FIG. 13A. In addition, the optical transmitter 10 outputs a PAM4 optical signal. In other words, each transmission symbol carries data of 2 bits. Accordingly, the DSP 2 generates two data sequences (bit0, bit1) from transmission data. Further, as illustrated in FIG. 7, each data sequence (bit0, bit1) is divided into two sub-data sequence groups (odd, even).

An optical DAC 11 corresponds to an electrode to which an output signal from the serializer 4a is given in the configuration illustrated in FIG. 10. Similarly, an optical DAC 12 corresponds to an electrode to which an output signal from the serializer 4b is given. In addition, the optical DAC 11 and optical DAC 12 output signals in synchronization with clock signals with phases mutually inverted. Further, the serializer and electrode are provided for each data sequence (bit0, bit1). An adder 13 indicates a state where optical signals representing respective data sequences are combined on the optical waveguide. A Nyquist filter (NF) 14 performs Nyquist filtering. The Nyquist filter 14 is not particularly limited, and for example, corresponds to an optical bandpass filter provided on an output side of the optical modulator 3. Then, a signal illustrated in FIG. 13B is input to the above-mentioned simulation model. FIG. 13B indicates a waveform and spectrum of the input signal.

Figure 13A:
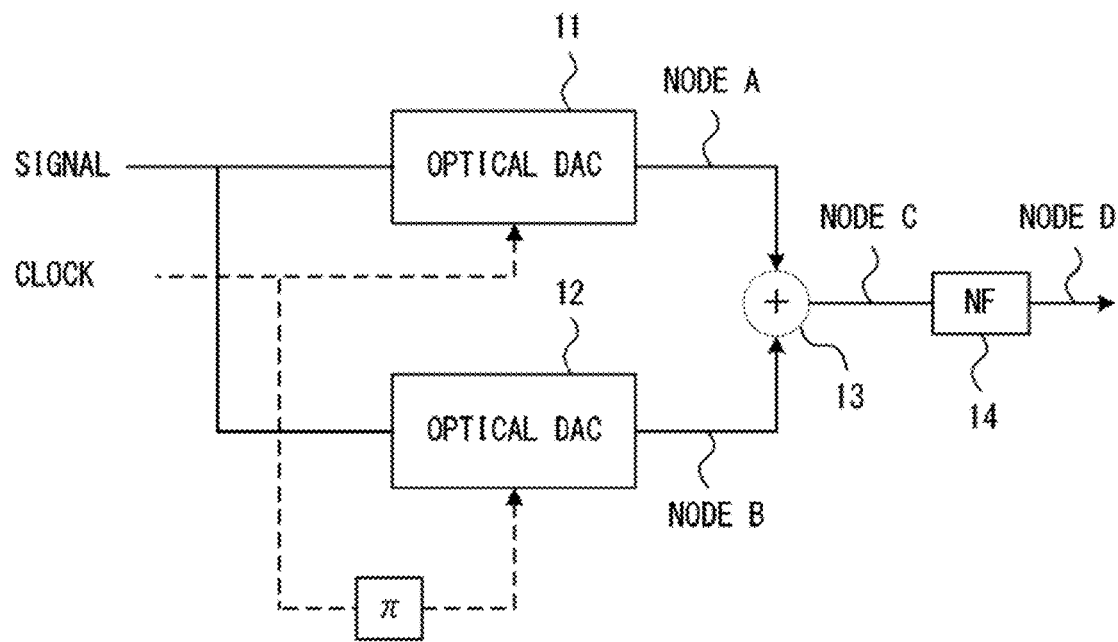
FIG. 13A illustrates an example of a simulation model.
Figure 13B:
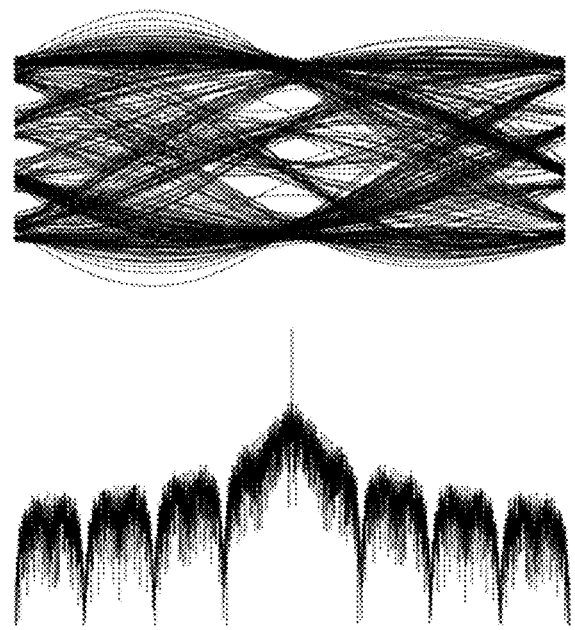
FIGS. 13B and 14A-14D illustrate waveforms and spectra of signals in the simulation model illustrated in FIG. 13A.
Figure 14A:
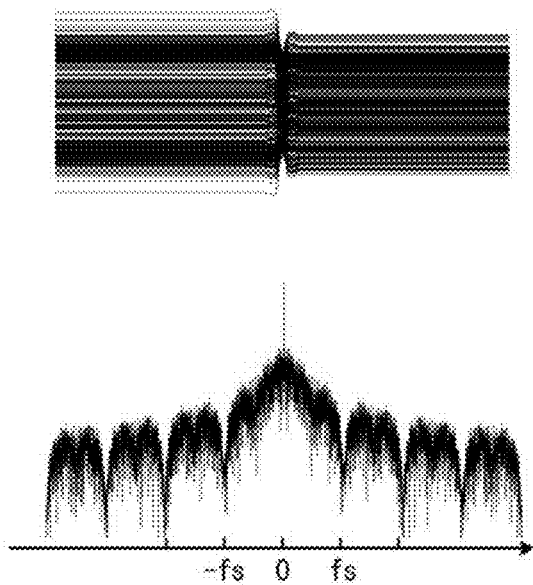
Figure 14B:
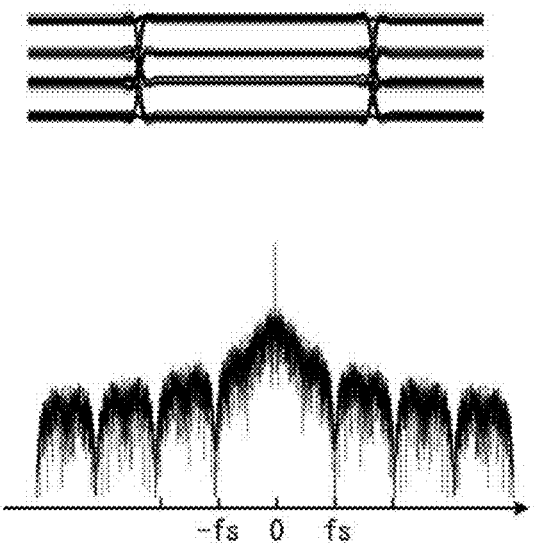
Figure 14C:
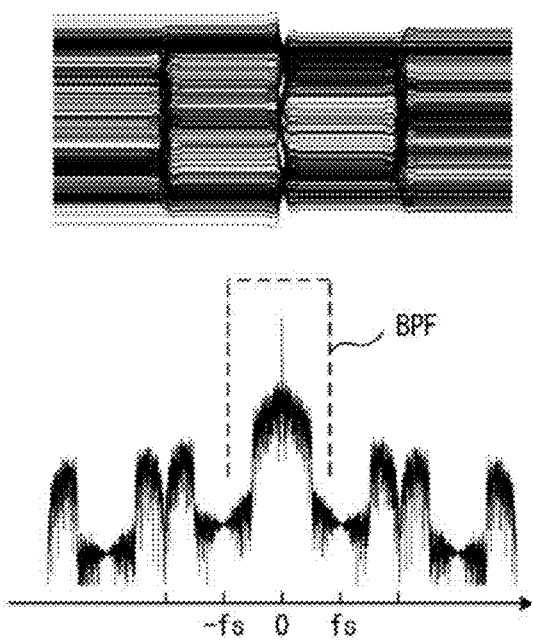

FIGS. 14A-14C indicate waveforms and spectra of optical signals in nodes A to C illustrated in FIG. 13A. In other words, FIG. 14A indicates the waveform and spectrum of the optical signal generated by the optical DAC 11. FIG. 14B indicates the waveform and spectrum of the optical signal generated by the optical DAC 12. FIG. 14C indicates the waveform and spectrum of the optical signal obtained by combining the optical signal generated by the optical DAC 11 and the optical signal generated by the optical DAC 12.

Figure 14D:
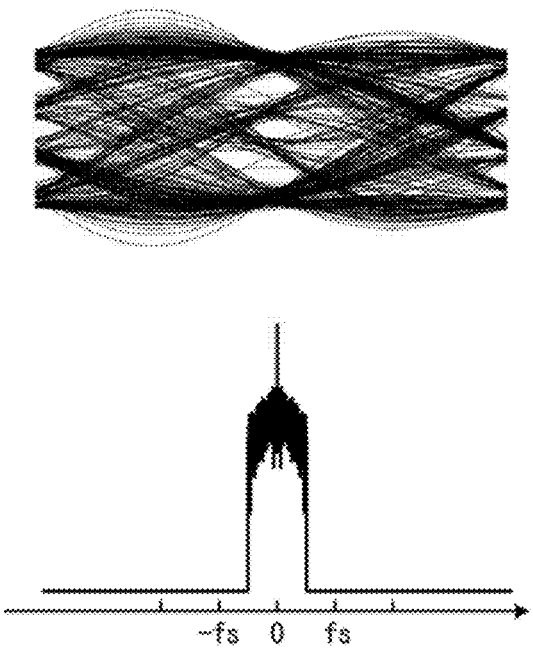

In the spectrum of the combined optical signal, as illustrated in FIG. 14C, a signal component in the frequency range spaced fs apart from the center is sufficiently suppressed. In other words, as in the case of performing oversampling by 2fs, an image component is suppressed. Accordingly, by using a bandpass filter BPF illustrated in FIG. 14C, it is possible to remove unnecessary components. In this embodiment, the Nyquist filter 14 is provided, and the waveform and spectrum illustrated in FIG. 14D are thereby obtained.

Figure 15A:
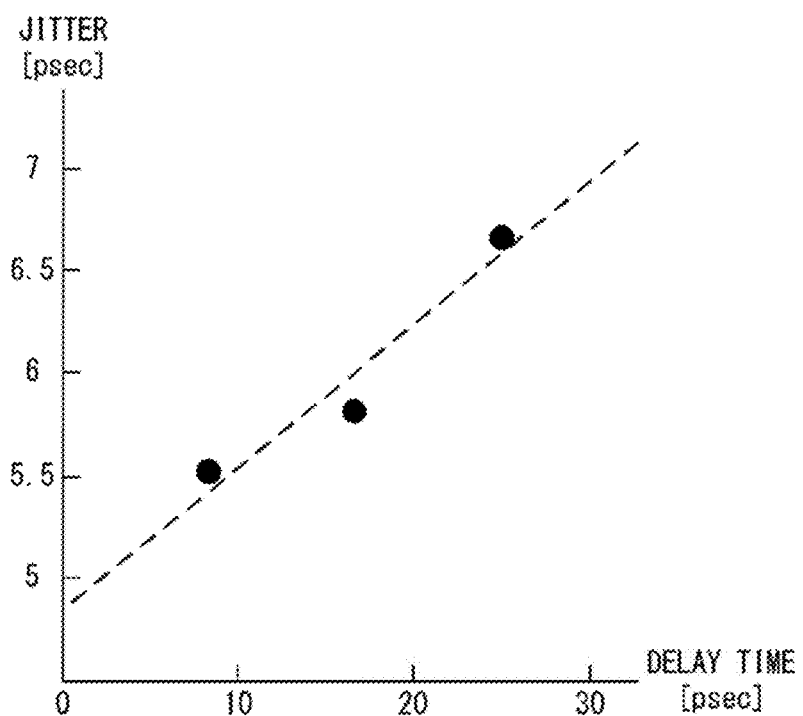
FIGS. 15A and 15B are graphs to explain effects caused by deleting a delay circuit.
Figure 15B:
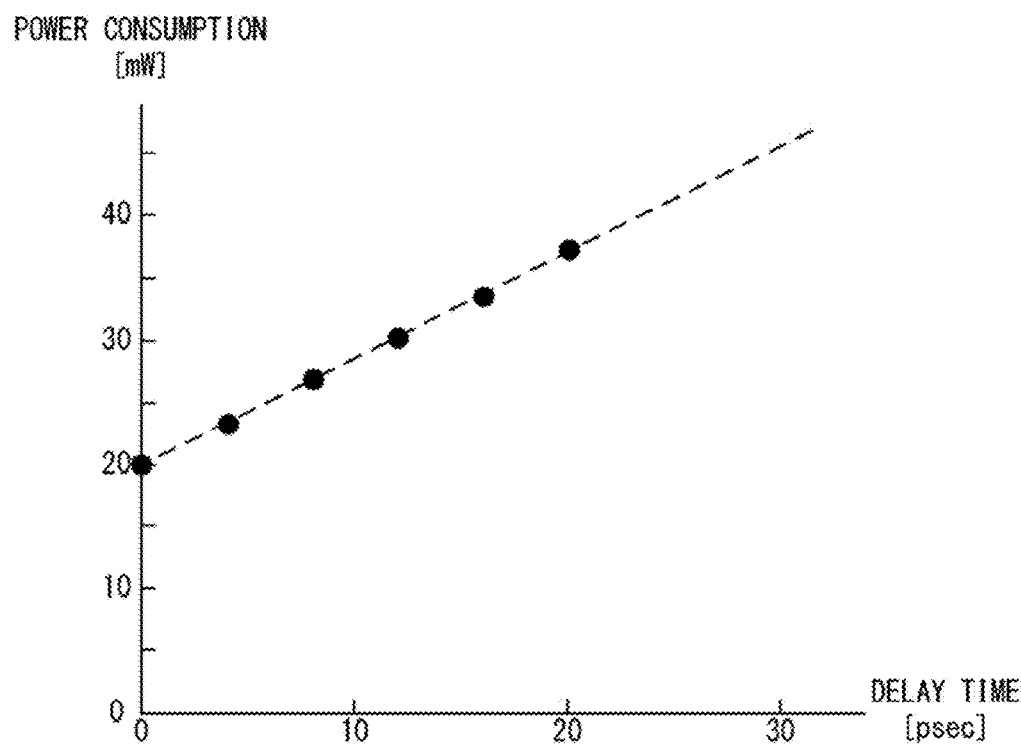

FIGS. 15A and 15B are graphs to explain the effect caused by deleting the delay circuit. In other words, the following description will explain the effect caused by deleting the delay circuit 6 illustrated in FIG. 8.

FIG. 15A indicates jitter of the optical signal output from the optical modulator 3. In addition, the horizontal axis of the graph represents delay time by the delay circuit 6 illustrated in FIG. 8. Herein, in examples illustrated in FIGS. 8 and 9A-9C, the delay time by the delay circuit 6 is 32 psec. In this case, jitter of about 7.1 psec occurs. In contrast thereto, the optical transmitter 10 illustrated in FIG. 10 is not equipped with the delay circuit 6. Accordingly, characteristics of the optical transmitter 10 correspond to a state corresponding to "delay time=0" in FIG. 15A. In other words, jitter of the optical signal output from the optical transmitter 10 is about 4.8 psec. Thus, by not using the delay circuit 6, jitter characteristics are improved.

FIG. 15B indicates power consumption of the optical DAC. In this example, in the optical transmitter 10 without being equipped with the delay circuit 6, power consumption of the optical DAC is about 20 mW. In contrast thereto, as the delay time by the delay circuit 6 increases, power consumption also increases in the delay circuit 6. As a result, in the case of generating the delay time of 32 psec, power consumption of the optical DAC is about 45.6 mW. Thus, by not using the delay circuit 6, it is possible to reduce power consumption.

Figure 16:
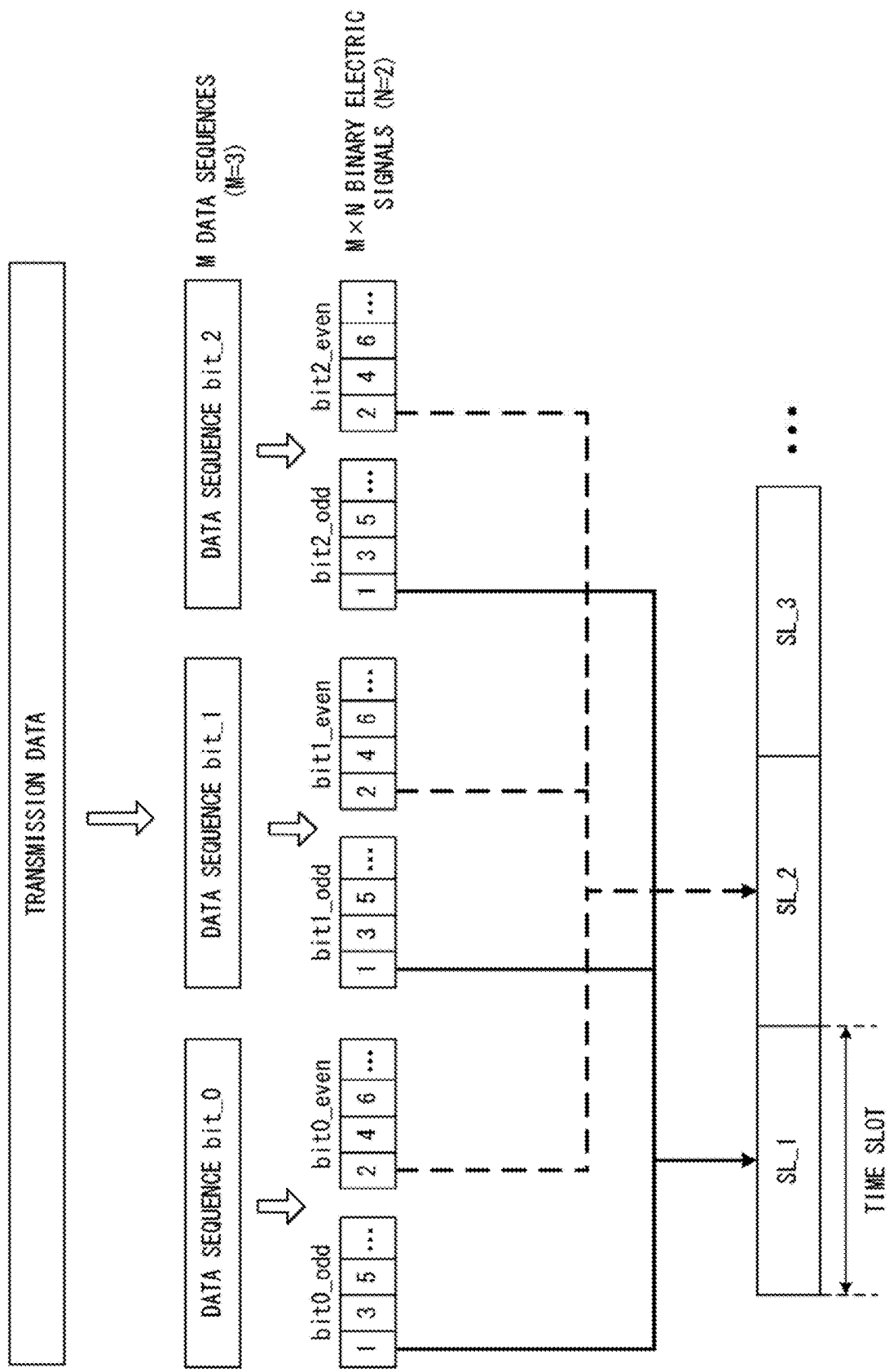
FIG. 16 schematically illustrates amplitude multiplexing and time-division multiplexing according to the embodiment of the present invention.

FIG. 16 schematically illustrates amplitude multiplexing and time-division multiplexing according to the embodiment of the present invention. In this example, the optical transmitter 10 generates an optical signal in which each symbol carries 3 bits. In other words, M=3. Further, the number of optical signals to multiplex by time-division multiplexing is "2" in the optical modulator 3. In other words, N=2. Accordingly, from transmission data are generated 6 binary electric signals (bit0_odd, bit0_even, bit1_odd, bit1_even, bit2_odd, bit2_even). In addition, in the configuration illustrated in FIG. 10, the binary electric signal is generated by amplifying the bit sequence serialized by the serializer by the driver.

Three optical signals generated by three binary electric signals bit0_odd, bit1_odd, bit2_odd are combined, and the resultant signal is inserted in a time slot SL1. At this point, amplitude of the optical signal generated by bit1_odd is twice amplitude of the optical signal generated by bit0_odd, and amplitude of the optical signal generated by bit2_odd is twice the amplitude of the optical signal generated by bit1_odd. By this means, a PAM8 symbol is generated which is one example of intensity modulation of 3 bits.

Next, three optical signals generated by three binary electric signals bit0_even, bit1_even, bit2_even are combined, the resultant signal is inserted in a time slot SL2, and the PAM 8 symbol is generated. Hereinafter, similarly, symbols each generated from three binary electric signals are sequentially inserted in time slots. By this means, time-division multiplexing is actualized.

Thus, according to the embodiment of the present invention, from the binary electric signal, it is possible to generate optical analog signals with the sampling rate or symbol rate being extremely high and with the high number of bits carried by each symbol. Accordingly, the embodiment of the present invention contributes to actualization of ultrahigh-speed optical transmission.

In addition, the optical transmitter is described which generates multilevel intensity modulated signals such as PAM4 and PAM8, but the present invention is not limited to the multilevel intensity modulated signal. In other words, by modifying the configuration of the optical transmitter appropriately, it is possible to apply the present invention to optical transmitters for generating multilevel coherent modulated optical signals such as a QPSK signal and QAM signal. Specifically, optical transmitters illustrated in FIGS. 8 and 10 are parallelized to form an IQ modulator where optical outputs of Mach-Zehnder interferometers are combined in a primary Mach-Zehnder interferometer, and a coherent modulated optical signal is thereby generated.

FIRST EXAMPLE

Figure 17:
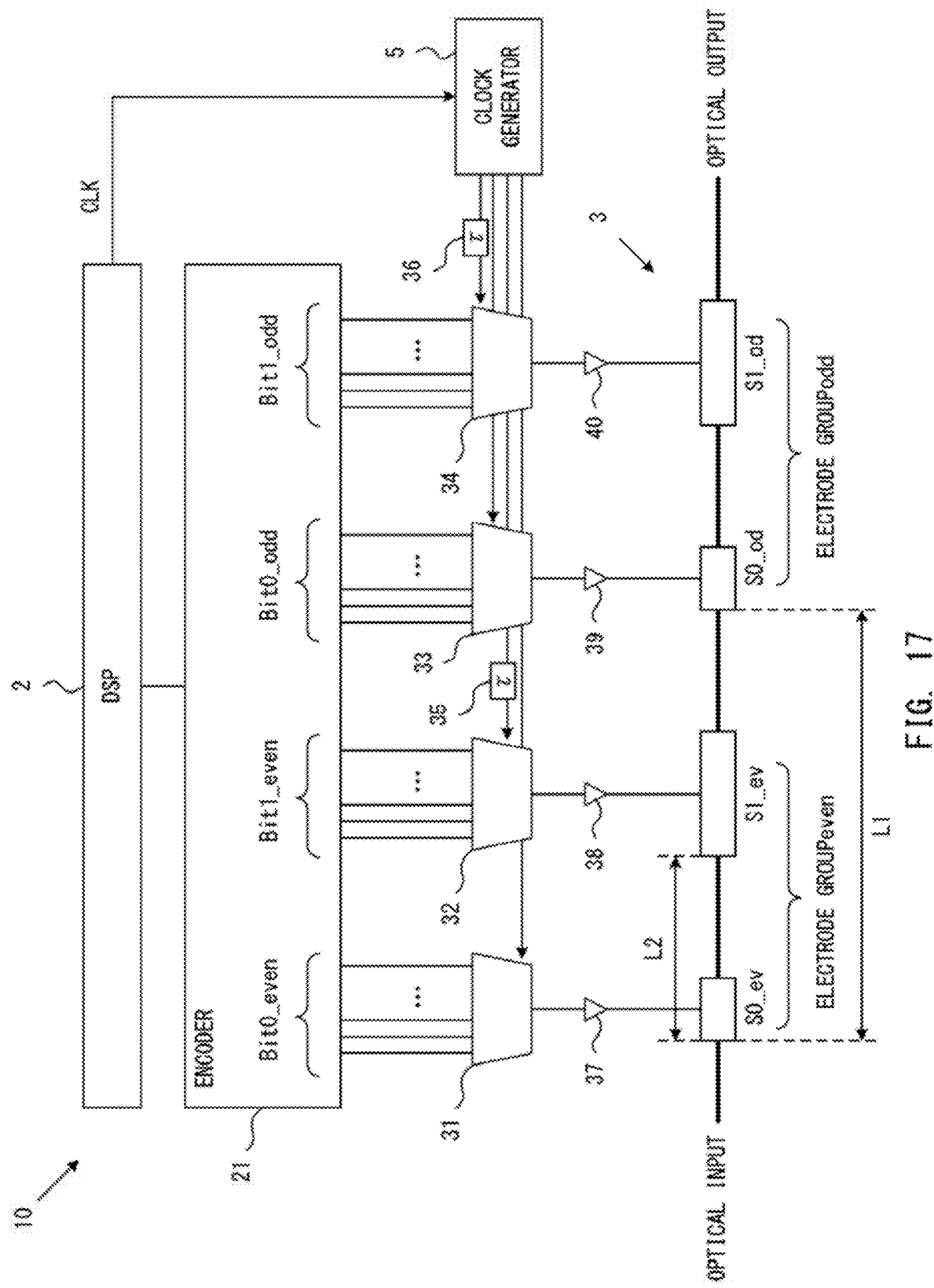
FIG. 17 illustrates a first example of the optical transmitter.

FIG. 17 illustrates a first example of an optical transmitter. The optical transmitter 10 according to the first example is equipped with the DSP 2, the optical modulator 3, the clock generator 5, an encoder 21, serializers 31-34, delay elements 35 and 36, and drivers 37-40.

In this example, M is 2. In other words, the optical transmitter 10 generates an optical signal in which each symbol carries 2 bits. Accordingly, the encoder 21 generates two data sequences (bit0 and bit1). Further, in this example, N is 2. Accordingly, the encoder 21 generates two sub-data sequence groups (odd and even) from each data sequence. In other words, the encoder 21 generates four sub-data sequence groups (bit0_odd, bit0_even, bit1_odd, bit1_even). In addition, for example, the encoder 21 is actualized by a hardware logic circuit. Alternatively, the encoder 21 may be implemented in the DSP 2.

As explained with reference to FIG. 7, each sub-data sequence group is comprised of a plurality of sub-data sequences. Then, the plurality of sub-data sequences constituting each sub-data sequence group is output in parallel, and are guided to a corresponding serializer.

Using the clock signal generated by the clock generator 5, each of the serializers 31-34 serializes a corresponding plurality of sub-data sequences. Specifically, the serializer 31 serializes a plurality of sub-data sequences belonging to sub-data sequence group bit0_even, and thereby generates a bit sequence bit0_even. The serializer 32 serializes a plurality of sub-data sequences belonging to sub-data sequence group bit1_even, and thereby generates a bit sequence bit1_even. The serializer 33 serializes a plurality of sub-data sequences belonging to sub-data sequence group bit0_odd, and thereby generates a bit sequence bit0_odd. The serializer 34 serializes a plurality of sub-data sequences belonging to sub-data sequence group bit1_odd, and thereby generates a bit sequence bit1_odd. Then, the bit sequences output from the serializers 31-34 are respectively guided to the drivers 37-40. In addition, clock signals given to the serializers 32 and 34 are delayed by the delay elements 35 and 36, respectively.

The drivers 37-40 generate binary electric signals from the bit sequences output from the serializers 31-34, respectively. Specifically, the driver 37 generates a binary electric signal bit0_even from the bit sequence bit0_even output from the serializer 31. The driver 38 generates a binary electric signal bit1_even from the bit sequence bit1_even output from the serializer 32. The driver 39 generates a binary electric signal bit0_odd from the bit sequence bit0_odd output from the serializer 33. The driver 40 generates a binary electric signal bit1_odd from the bit sequence bit1_odd output from the serializer 34. Thus, M×N (i.e., 4) binary electric signals are generated. Then, these binary electric signals are given to the optical modulator 3.

The optical modulator 3 is provided with a plurality of electrodes along an optical path of the Mach-Zehnder interferometer. In this Embodiment, M×N (i.e., 4) electrodes are provided. In addition, although being omitted to make the figure visible easily, the electrodes are provided in both of the P arm and N arm.

In this example, an electrode S0_ev, electrode S1_ev, electrode S0_od and electrode S1_od are sequentially provided from an input end toward an output end of the Mach-Zehnder interferometer. The binary electric signals bit0_even, bit1_even, bit0_odd and bit1_odd are respectively given to the electrode S0_ev, electrode S1_ev, electrode S0_od and electrode S1_od. In addition, lengths of the electrode S0_ev and the electrode S0_od are equal to each other, and lengths of the electrode S1_ev and the electrode S1_od are equal to each other. Further, the lengths of the electrode S1_ev and the electrode S1_od are twice the lengths of the electrode S0_ev and the electrode S0_od, respectively.

A plurality of electrodes are grouped based on the time slot of time-division multiplexing. In this example, the electrode S0_ev and the electrode S1_ev belong to an electrode group even, and the electrode S0_od and the electrode S0_od belong to an electrode group odd.

A distance L1 between the electrode included in the electrode group even and the electrode included in the electrode group odd is expressed by the following equation.

$$L1 = c/(ng \times fs)$$

In other words, the distance between the electrode S0_ev and the electrode S0_od is L1, and the distance between the electrode S1_ev and the electrode S0_od is also L1. In addition, fs corresponds to a length of a single time slot when the optical signal generated corresponding to the signal given to the electrode group even and the optical signal generated corresponding to the signal given to the electrode group odd are multiplexed in the time domain. Accordingly, L1 corresponds to a distance that light propagates in the optical waveguide for a time corresponding to the time slot of time-division multiplexing. Further, in this example, since each symbol carries M bits, when a bit rate of the transmission data is B, L1 corresponds to a distance that light propagates in the optical path for a period M/B.

A distance L2 between electrodes inside each electrode group is not limited particularly. However, in order that timings of bit0 and bit1 of the PAM4 optical signal coincide with each other, it is required that the time taken for light to propagate by the distance L2 coincides with the delay time of the delay elements 35 and 36. Accordingly, the delay element 35 is designed so that the delay time of the delay element 35 is the same as the time required for light to propagate from the electrode S0_ev to the electrode S1_ev via the optical waveguide. Similarly, the delay element 36 is designed so that the delay time of the delay element 36 is the same as the time required for light to propagate from the electrode S0_od to the electrode S1_od via the optical waveguide.

In addition, in FIG. 17, the encoder 21, the serializers 31-34, the delay elements 35 and 36, the drivers 37-40 and the clock generator 5 are one example of a signal generator for generating M×N binary electric signals with the same bit rates from the transmission data. Further, the electrode S0_ev, electrode S1_ev, electrode S0_od and electrode S1_od are one example of M×N phase-shift segments for shifting phases of light propagating through the optical path corresponding to the M×N binary electric signals, respectively.

Figure 18:
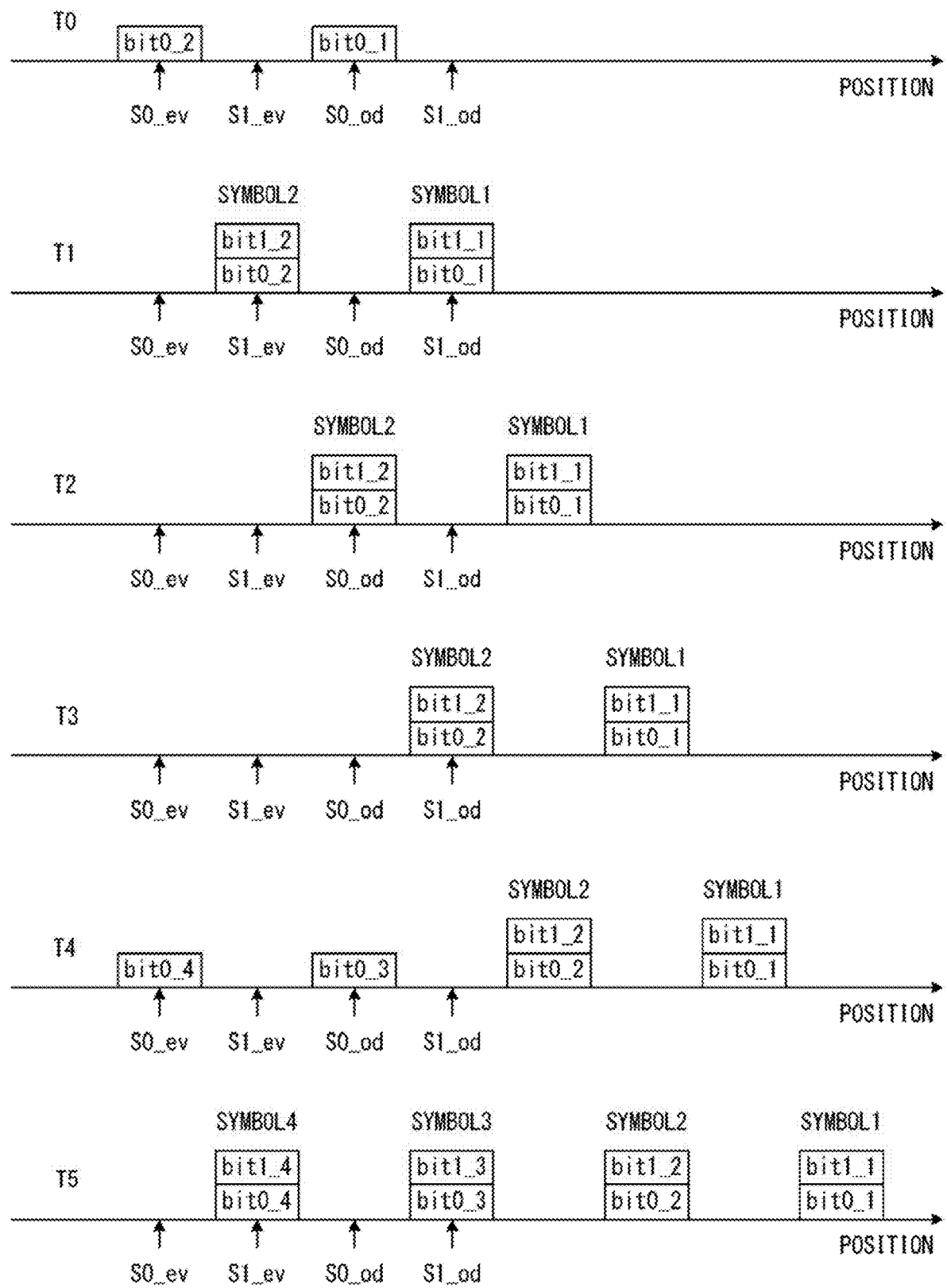
FIG. 18 illustrates an example of amplitude multiplexing and time-division multiplexing by the optical transmitter illustrated in FIG. 17.

FIG. 18 illustrates an example of amplitude multiplexing and time-division multiplexing by the optical transmitter illustrated in FIG. 17. The horizontal axis represents a position in the propagation direction of light inside the Mach-Zehnder interferometer. "S0_ev" "S1_ev", "S0_od" and "S1_od" represent positions in which the electrode S0_ev, electrode S1_ev, electrode S0_od and electrode S1_od are provided, respectively.

At time T0, the electric signal bit0_1 and electric signal bit0_2 arrive at the electrode S0_od and electrode S0_ev, respectively. Then, an optical signal bit0_1 is generated in the electrode S0_od, and an optical signal bit0_2 is generated in the electrode S0_ev.

At time T1, the optical signal bit0_1 arrives at the electrode S1_od, and the optical signal bit0_2 arrives at the electrode S1_ev. Further, the electric signal bit1_1 and electric signal bit1_2 arrive at the electrode S1_od and electrode S1_ev, respectively. Then, an optical signal bit1_1 is generated in the electrode S1_od, and an optical signal bit1_2 is generated in the electrode S1_ev. Accordingly, in the electrode S1_od, the optical signal bit0_1 and optical signal bit1_1 are combined, and a transmission symbol 1 is generated. Similarly, in the electrode S1_ev, the optical signal bit0_2 and optical signal bit1_2 are combined, and a transmission symbol 2 is generated. Subsequently, during time period T1-T4, the transmission symbols 1 and 2 propagate toward an output port of the Mach-Zehnder interferometer.

At time T4, the electric signal bit0_3 and electric signal bit0_4 arrive at the electrode S0_od and electrode S0_ev, respectively. Then, an optical signal bit0_3 is generated in the electrode S0_od, and an optical signal bit0_4 is generated in the electrode S0_ev.

At time T5, the optical signal bit0_3 arrives at the electrode S1_od, and the optical signal bit0_4 arrives at the electrode S1_ev. Further, the electric signal bit1_3 and electric signal bit1_4 arrive at the electrode S1_od and electrode S1_ev, respectively. Then, an optical signal bit1_3 is generated in the electrode S1_od, and an optical signal bit1_4 is generated in the electrode S1_ev. Accordingly, in the electrode S1_od, the optical signal bit0_3 and optical signal bit1_3 are combined, and a transmission symbol 3 is generated. Similarly, in the electrode S1_ev, the optical signal bit0_4 and optical signal bit1_4 are combined, and a transmission symbol 4 is generated. Subsequently, the transmission symbols 1-4 propagate toward the output port of the Mach-Zehnder interferometer. Thus, amplitude multiplexing (bit0, bit1) and time-division multiplexing (odd, even) are concurrently actualized.

SECOND EXAMPLE

Figure 19:
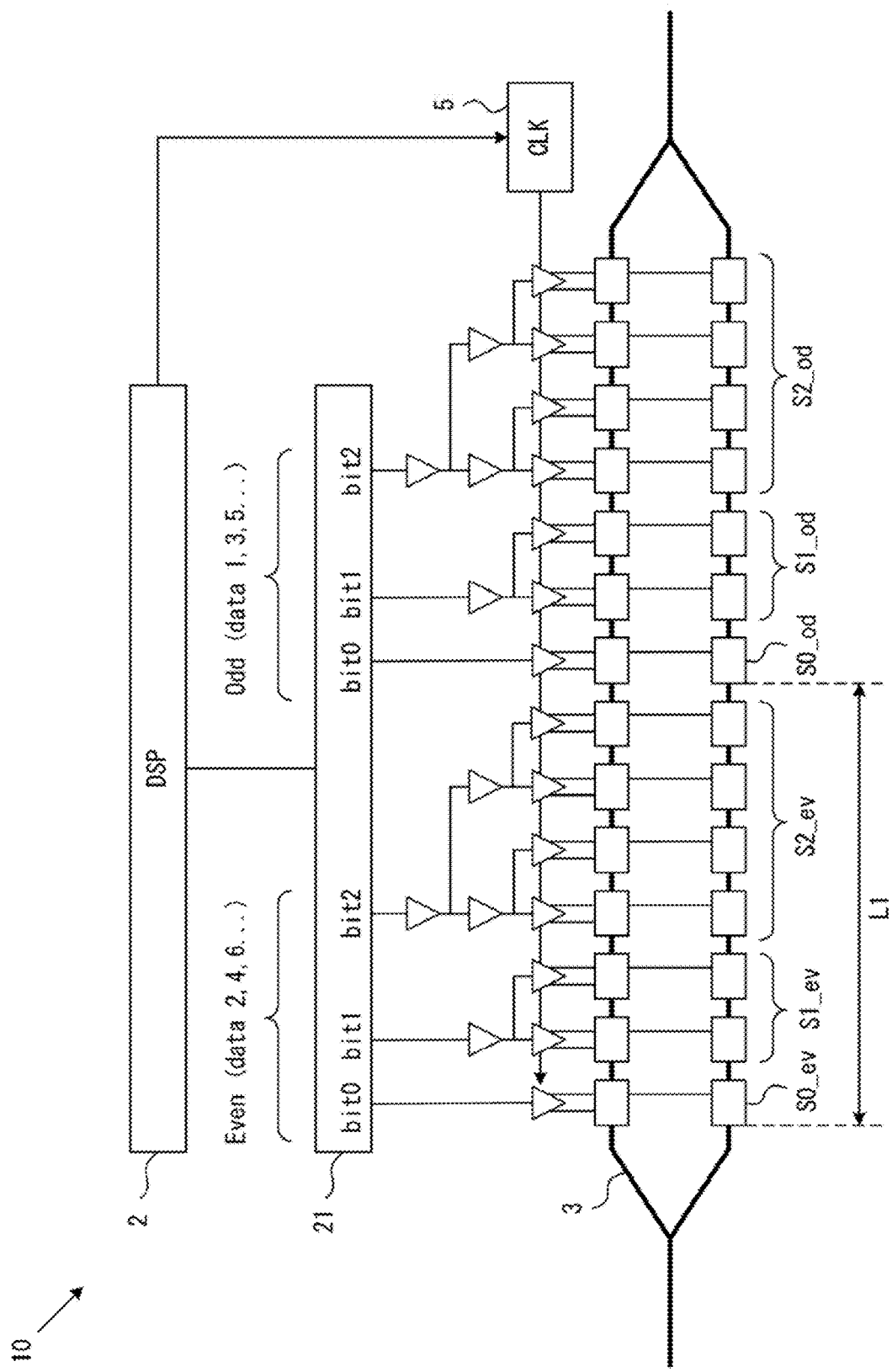
FIG. 19 illustrates a second example of the optical transmitter.

FIG. 19 illustrates a second example of the optical transmitter. In the second example, M is 3. In other words, the optical transmitter 10 generates optical signals in which each symbol carries 3 bits. Accordingly, the encoder 21 generates 3 data sequences (bit0, bit1, bit2). Further, in this example, N is 2. Accordingly, the encoder 21 generates 2 sub-data sequence groups (odd, even) from each of the data sequences. In other words, the encoder 21 generates six sub-data sequence groups (bit0_odd, bit0_even, bit1_odd, bit1_even, bit2_odd, bit2_even). Accordingly, six bit sequences are generated.

The optical modulator 3 is equipped with phase-shift segments for respective bit sequences. In FIG. 19, phase-shift segments S0_ev, S1_ev, S2_ev, S0_od, S1_od, S2_od are provided.

Each phase-shift segment is equipped with one or a plurality of electrodes. Specifically, each of the phase-shift segments S0_ev, S0_od to generate the optical signal corresponding to the bit0 is equipped with 1 electrode. Each of the phase-shift segments S1_ev, S1_od to generate the optical signal corresponding to the bit1 is equipped with two electrodes. Each of the phase-shift segments S2_ev, S2_od to generate the optical signal corresponding to the bit2 is equipped with four electrodes. In this configuration, the length of each of the electrodes is the same.

The phase-shift segments S0_od, S1_od, S2_od constitute one electrode group, and the phase-shift segments S0_ev, S1_ev, S2_ev also constitute one electrode group. Then, the distance L1 between corresponding phase-shift segments (or, electrodes) in the groups is expressed by the following equation.

$$L1 = c/(ng \times fs)$$

Specifically, the distance between the phase-shift segment S0_ev and the phase-shift segment S0_od is L1. Further, the distance between each electrode of the phase-shift segment S1_ev and each respective electrode of the phase-shift segment S0_od is also L1. Furthermore, the distance between each electrode of the phase-shift segment S2_ev and each respective electrode of the phase-shift segment S2_od is also L1.

Transceiver

Figure 20:
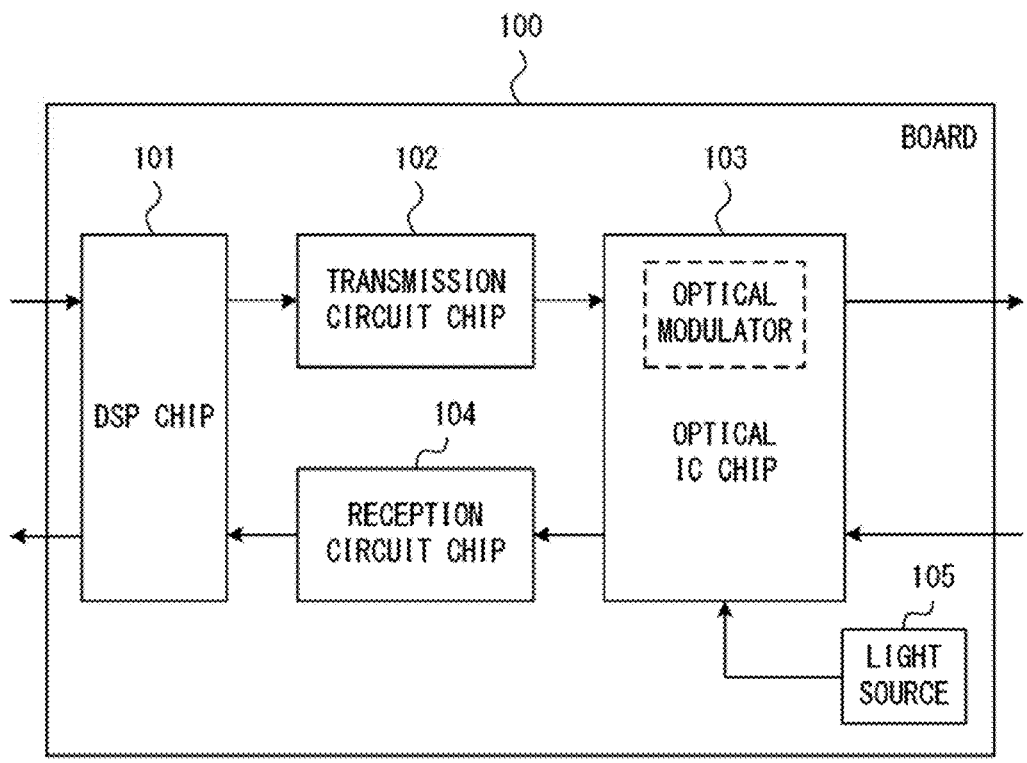
FIG. 20 illustrates an example of an optical transceiver including the optical transmitter.

FIG. 20 illustrates an example of an optical transceiver including the optical transmitter according to the embodiment of the present invention. The optical transceiver is equipped with a DSP chip 101, a transmission circuit chip 102, an optical integrated circuit chip 103, a reception circuit chip 104, and light source 105, and is implemented on a board 100.

The transmission circuit chip 102 includes the serializer, the clock generator, the driver, the encoder and the like illustrated in FIG. 10. In addition, the encoder may be actualized by the DSP chip 101. The optical integrated circuit chip 103 includes the optical modulator 3 illustrated in FIG. 10, and generates a modulated optical signal using continuous wave light generated by the light source 105. Further, for example, by coherent detection, the optical integrated circuit chip 103 generates an electric signal representing a received optical signal. In this case, the optical integrated circuit chip 103 performs coherent detection using the continuous wave light generated by the light source 105. The DSP chip 101 includes the DSP 2 illustrated in FIG. 10. Further, the DSP chip 101 recovers data from an output signal of the reception circuit chip 104.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter that transmits a modulated optical signal in which each symbol generated by the optical transmitter carries M bits, M being an integer larger than one, the optical transmitter comprising:
   a signal generation circuit configured to generate M×N binary electric signals based on transmission data, bit rates of the M×N binary electric signals being equal to each other, N being an integer larger than one, the optical transmitter multiplexes N optical signals in time-division multiplexing;
   a Mach-Zehnder interferometer; and
   M×N phase-shift elements provided along an optical path of the Mach-Zehnder interferometer and respectively configured to shift phases of light propagated in the optical path corresponding to the M×N binary electric signals,
   the M×N phase-shift segments are comprised of N electrode groups,
   each of the N electrode groups includes M or more electrodes to which corresponding M binary electric signals among the M×N binary electric signals are given,
   the N electrode groups are provided in series along the optical path of the Mach-Zehnder interferometer, and
   a distance between an electrode included in a first electrode group and a corresponding electrode included in a second electrode group adjacent to the first electrode group among the N electrode groups is a distance that light propagates in the optical path for a time corresponding to one time slot of the time-division multiplexing.

2. The optical transmitter according to claim 1, wherein each of the N electrode groups is comprised of M electrodes with lengths being different from one another.

3. The optical transmitter according to claim 1, wherein each of the N electrode groups is comprised of a number of electrodes with lengths being equal to each other, the number of electrodes being higher than M.

4. The optical transmitter according to claim 1, wherein the signal generation circuit adjusts timings of the M×N binary electric signals so that M optical signals corresponding to the M binary electric signals given to each of the N electrode groups overlap one another in a time domain.

5. The optical transmitter according to claim 1, wherein the signal generation circuit includes
   an encoder configured to generate M×N×K sub-data sequences based on the transmission data, K being an integer larger than one,
   M×N serializers,
   M×N drivers, and
   a clock generation circuit configured to generate a clock signal, the M×N serializers select bits sequentially from corresponding K sub-data sequences by using the clock signal to generate M×N bit sequences, and the M×N drivers generate the M×N binary electric signals from the M×N bit sequences.

6. An optical transmitter that transmits a modulated optical signal in which each symbol generated by the optical transmitter carries M bits, M being an integer larger than one, the optical transmitter comprising:

a signal generation circuit configured to generate M×N binary electric signals based on transmission data, bit rates of the M×N binary electric signals being equal to each other, N being an integer larger than one, wherein the optical transmitter multiplexes N optical signals in time-division multiplexing;

a Mach-Zehnder interferometer; and

M×N phase-shift elements provided along an optical path of the Mach-Zehnder interferometer and respectively configured to shift phases of light propagated in the optical path corresponding to the M×N binary electric signals, the M×N phase-shift segments are comprised of N electrode groups, each of the N electrode groups includes M or more electrodes to which corresponding M binary electric signals among the M×N binary electric signals are given, the N electrode groups are provided in series along the optical path of the Mach-Zehnder interferometer, and a distance between an electrode included in a first electrode group and a corresponding electrode included in a second electrode group adjacent to the first electrode group among the N electrode groups is a distance that light propagates in the optical path for a period M/B when a bit rate of the transmission data is B.

7. An optical transceiver including an optical receiver and an optical transmitter that transmits a modulated optical signal in which each symbol generated by the optical transmitter carries M bits, M being an integer larger than one, the optical transmitter includes a signal generation circuit configured to generate M×N binary electric signals based on transmission data, bit rates of the M×N binary electric signals being equal to each other, N being an integer larger than one, the optical transmitter multiplexes N optical signals in time-division multiplexing, a Mach-Zehnder interferometer, and M×N phase-shift elements provided along an optical path of the Mach-Zehnder interferometer and respectively configured to shift phases of light propagated in the optical path corresponding to the M×N binary electric signals, the M×N phase-shift segments are comprised of N electrode groups, each of the N electrode groups includes M or more electrodes to which corresponding M binary electric signals among the M×N binary electric signals are given, the N electrode groups are provided in series along the optical path of the Mach-Zehnder interferometer, and a distance between an electrode included in a first electrode group and a corresponding electrode included in a second electrode group adjacent to the first electrode group among the N electrode groups is a distance that light propagates in the optical path for a time corresponding to one time slot of the time-division multiplexing.

* * * * *